US012650293B2

(12) United States Patent
Frisken

(10) Patent No.: US 12,650,293 B2
(45) Date of Patent: Jun. 9, 2026

(54) SPECTRAL DOMAIN OPTICAL IMAGING WITH WAVELENGTH COMB ILLUMINATION

(71) Applicant: CYLITE PTY LTD, Mulgrave (AU)

(72) Inventor: Steven James Frisken, Vaucluse (AU)

(73) Assignee: Alcon Inc., Fribourg (CH)

( * ) Notice: Subject to any disclaimer, the term of this patent is extended or adjusted under 35 U.S.C. 154(b) by 128 days.

(21) Appl. No.: 18/294,666

(22) PCT Filed: Aug. 4, 2022

(86) PCT No.: PCT/AU2022/050841
§ 371 (c)(1),
(2) Date: Feb. 2, 2024

(87) PCT Pub. No.: WO2023/010174
PCT Pub. Date: Feb. 9, 2023

(65) Prior Publication Data
US 2024/0344819 A1 Oct. 17, 2024

(30) Foreign Application Priority Data

Aug. 4, 2021 (AU) ................................ 2021902411

(51) Int. Cl.
*G01B 9/02091* (2022.01)
*G01B 9/02* (2022.01)
*G01B 9/02001* (2022.01)

(52) U.S. Cl.
CPC ..... *G01B 9/02091* (2013.01); *G01B 9/02008* (2013.01); *G01B 9/02044* (2013.01)

(58) Field of Classification Search
CPC ............ G01B 9/02091; G01B 9/02008; G01B 9/02044; G01B 9/02041; A61B 3/102;
(Continued)

(56) References Cited

U.S. PATENT DOCUMENTS 5,465,147 A * 11/1995 Swanson ............ A61B 1/00183
356/497
7,404,640 B2 7/2008 Ferguson et al.
(Continued)

FOREIGN PATENT DOCUMENTS

EP 3993397 A1 5/2022
WO 2008/148237 A1 12/2008
(Continued)

OTHER PUBLICATIONS

T. Bajraszewski et al 'Improved spectral optical coherence tomography using optical frequency comb' Optics Express, vol. 16, No. 6, Mar. 12, 2008, pp. 4163-4176.
(Continued)

*Primary Examiner* — Tarifur R Chowdhury
*Assistant Examiner* — Maher Yazback
(74) *Attorney, Agent, or Firm* — Nicholas Smith

(57) ABSTRACT

Apparatus and methods are presented for spectral domain optical imaging, in particular for single shot 3-D spectral domain imaging of the retina or angio-OCT applications, using an extended illumination field comprising a plurality of linearly displaced combs of wavelengths selected from across the light source bandwidth. This allows recovery of phase and amplitude information at many times the Nyquist depth, without the loss of optical power that would be incurred by traditional wavelength comb generators such as etalons. Spatially incoherent or partially spatially incoherent light sources can be used in certain embodiments. In certain embodiments a temporally modulated angular component is imposed on a short axis of the extended illumination field. In preferred embodiments light reflected or scattered from the object is sparsely sampled in the far field, e.g. at a Fourier plane, in a dimension perpendicular to the long axis of the extended illumination field.

22 Claims, 9 Drawing Sheets

(58) Field of Classification Search
CPC .... A61B 3/0008; A61B 3/0025; G01J 3/2823; G01N 21/17; G01N 21/25; G01N 2021/1787
See application file for complete search history.

(56) References Cited

U.S. PATENT DOCUMENTS

| | | | | |
|---|---|---|---|---|
| 7,695,140 | B2 * | 4/2010 | Fercher | A61B 3/102 |
| | | | | 351/221 |
| 8,446,593 | B1 | 5/2013 | Ellerbee | |
| 9,239,263 | B2 * | 1/2016 | Kester | G01J 3/2823 |
| 9,243,888 | B2 * | 1/2016 | Tkaczyk | G01J 3/453 |
| 9,861,277 | B2 * | 1/2018 | Anderson | A61B 3/1015 |
| 9,955,863 | B2 * | 5/2018 | Frisken | A61B 3/102 |
| 10,799,111 | B2 * | 10/2020 | Schmoll | A61B 3/152 |
| 2008/0094613 | A1 | 4/2008 | De Boer et al. | |
| 2010/0149487 | A1 * | 6/2010 | Ribak | A61B 3/12 |
| | | | | 356/632 |
| 2011/0235045 | A1 | 9/2011 | Koerner et al. | |
| 2011/0292399 | A1 | 12/2011 | Alphonse | |
| 2012/0127472 | A1 | 5/2012 | Alphonse | |
| 2012/0327423 | A1 * | 12/2012 | Hanebuchi | G01B 9/02019 |
| | | | | 356/497 |
| 2014/0028974 | A1 | 1/2014 | Tumlinson | |
| 2014/0320816 | A1 * | 10/2014 | Abramoff | A61B 3/102 |
| | | | | 356/326 |
| 2015/0077760 | A1 * | 3/2015 | Koerner | G01B 9/02027 |
| | | | | 356/496 |
| 2015/0216412 | A1 * | 8/2015 | Hillmann | A61B 3/1225 |
| | | | | 351/207 |
| 2016/0000320 | A1 * | 1/2016 | Sharma | G01J 3/2823 |
| | | | | 351/246 |
| 2016/0135679 | A1 * | 5/2016 | Frisken | G01B 9/02044 |
| | | | | 351/212 |
| 2016/0345820 | A1 | 12/2016 | Frisken et al. | |
| 2019/0117077 | A1 | 4/2019 | Lee et al. | |
| 2019/0223729 | A1 | 7/2019 | Frisken | |
| 2019/0226991 | A1 | 7/2019 | Sinha et al. | |
| 2020/0103215 | A1 | 4/2020 | Frisken | |
| 2023/0087685 | A1 | 3/2023 | Frisken | |
| 2023/0125131 | A1 * | 4/2023 | Gao | H04N 13/232 |
| | | | | 349/15 |

FOREIGN PATENT DOCUMENTS

| | | |
|---|---|---|
| WO | 2010/040570 A1 | 4/2010 |
| WO | 2011/050249 A1 | 4/2011 |
| WO | 2014/201503 A1 | 12/2014 |
| WO | 2016/187675 A1 | 12/2016 |
| WO | 2017/176300 A1 | 10/2017 |
| WO | 2018/000036 A1 | 1/2018 |
| WO | 2018/136993 A1 | 8/2018 |
| WO | 2020/260737 A1 | 12/2020 |
| WO | 2021/151164 A1 | 8/2021 |

OTHER PUBLICATIONS

Qingli Li, et al. "Review of spectral imaging technology in biomedical engineering: achievements and challenges", Journal of Biomedical Optics 18 (10), Oct. 2013.

Lucian Plesea, et al., "Direct corneal elevation measurements using multiple delay en face optical coherence tomography", Journal of Biomedical Optics vol. 13 (5), Sep./Oct. 2008.

Trevor Anderson et al. "3D-Spectral Domain Computational Imaging", Proce. Spie 9697, Optical Coherence Tomography and Coherence Domain Optical Methods in Biomedicine XX, 96970Z, Mar. 8, 2016.

Berto et al., "Wavefront-sensing with a thin diffuser", Optics Letters, Oct. 10, 2017.

Sergio Bonaque-Gonzalez, et al., "Extremely high resolution ocular aberrometry up to 2.4 million points", Investigative Ophthalmology & Visual Science, vol. 60, 603, Jul. 2019.

Robert Content, et al., "New Microslice Technology for Hyperspectral Imaging", Remote Sensing, Mar. 6, 2013.

Changgeng Liu et al., "Coherent artifact suppression in line-field reflection confocal microscopy using a low spatial coherence light source", Optics Letter, vol. 41, No. 20, Oct. 15, 2016.

Thomas Klein et al., "High-speed OCT light sources and systems [Invited]", Biomedical Optics Express 828, vol. 8, No. 2, Feb. 1, 2017.

Yoshifumi Nakamura et al. " High-speed three-dimensional human retinal imaging by line-field spectral domain optical coherence tomography", Optics Express, vol. 15, No. 12, Jun. 11, 2007.

R. Claveau et al 'Depth-resolved local reflectance spectra measurements in full-field optical coherence tomography' Optics Express , vol. 25, No. 17, Aug. 21, 2017, pp. 20216-20232.

International Search Report of PCT/AU2022/050841 dated Oct. 24, 2022.

Extended European Search Report of 22851485.7/EP4380424 dated Nov. 26, 2024.

* cited by examiner

SPECTRAL DOMAIN OPTICAL IMAGING WITH WAVELENGTH COMB ILLUMINATION

FIELD OF THE INVENTION

The invention relates to apparatus and methods for spectral domain optical imaging, in particular for 3-D spectral domain imaging of the retina, cornea or other structures of the human eye using wavelength comb illumination. However it will be appreciated that the invention is not limited to this particular field of use.

RELATED APPLICATIONS

The present application claims priority from Australian Provisional Patent Application No 2021902411 filed on 4 Aug. 2021, the contents of which are incorporated herein by reference.

BACKGROUND OF THE INVENTION

Any discussion of the prior art throughout the specification should in no way be considered as an admission that such prior art is widely known or forms part of the common general knowledge in the field anywhere in the world.

Optical coherence tomography (OCT) is a widely used interferometric technique for studying biological samples including in-vivo tissue such as the human eye, with lateral and depth resolution, using information contained in the amplitude and phase of light reflected or scattered from the sample. Most current OCT systems utilise spectral domain techniques where the depth information is encoded in the spectral response of the interference signal, which can be recorded as a time-varying function of wavelength (swept source OCT) or by dispersing the interference signal and detecting the different wavelengths simultaneously along a detector array (spectrometer-based OCT).

Many OCT systems acquire depth-resolved data at discrete points, i.e. A-scans, and use beam scanning in one or two lateral dimensions to generate B-scans (depth-resolved data in one lateral dimension) or C-scans (depth-resolved data in two lateral dimensions). Faster acquisition is generally desirable irrespective of the type of scan, especially for reducing motion-induced artefacts with in-vivo samples. So-called 'snapshot' spectrometer-based OCT approaches, in which depth-resolved data from a slice or volume of an object is acquired in a single frame of a sensor array, are particularly advantageous for reducing motion-induced artefacts. This is in contrast to swept source OCT approaches relying on sweeping a wavelength and capturing multiple frames corresponding to each of the wavelengths, which are highly sensitive to submicron shifts of the object during acquisition. Published US patent application No 2014/0028974 A1 entitled 'Line-field holoscopy' discloses a single-shot B-scan technique in which cylindrical lenses produce a line illumination on an object and on a reference mirror, followed by dispersion of the combined return sample and reference beams along one axis of a two-dimensional (2-D) sensor array. Advantageously, the holoscopic nature of this technique, where the sensor array is imaged to the far field of the object, allows digital refocusing and aberration correction as well as a degree of confocal rejection. However for full 3-D (C-scan) imaging the illuminated line needs to be scanned in the orthogonal direction and the 2-D sensor array read out repeatedly, and with in-vivo samples it is generally difficult to maintain phase stability between the consecutive B-scans. Consequently the achievable resolution and depth of focus tend to be highly anisotropic.

As disclosed in published US patent application No 2016/0345820 A1 entitled 'High resolution 3-D spectral domain optical imaging apparatus and method', single-shot C-scan acquisition can be achieved if a 2-D area of an object is illuminated and the combined returning sample and reference wavefronts sampled in two lateral dimensions, e.g. with a 2-D lenslet array, and the resulting sampling points dispersed onto separate sets of pixels of a 2-D sensor array. Digital refocusing can then be applied to the tomograms. To image larger volumes, tomograms of multiple adjacent or overlapping volumes can be acquired by moving the object relative to the illuminated area in one or two dimensions, then stitched together, with the overall acquisition speed limited by the frame rate of the 2-D sensor array. The lateral resolution depends largely on the NA of the objective lens and may for example be around 3 μm. A limitation with this technique is that the illuminated area on the object needs to be relatively small, of order 100 μm×100 μm, to reduce the impact of multiple scattering and because of the limited number of sampling points offered by commercially available 2-D lenslet arrays.

Techniques for single-shot C-scan acquisition from significantly larger volumes of an object than can be achieved with the symmetrical sampling method of US 2016/0345820 A1 are disclosed in published PCT patent application No WO 2021/151164 A1 entitled 'Apparatus and method for spectral domain optical imaging'. In this approach an object volume having an elongated lateral cross-sectional area is illuminated and the scattered or reflected light captured and anisotropically transformed, combined with a reference beam and sampled in one dimension, e.g. with a cylindrical lenslet array, before being projected onto a 2-D sensor array for acquisition of phase and amplitude information and generation of a 3-D image of the illuminated volume of the object. The illuminated cross-sectional area may be of order tens of microns by several millimetres, for example 50 μm×3 mm, and may be substantially rectangular or elliptical in shape, or any other elongated shape with a longer dimension significantly larger than a shorter dimension. Despite the highly laterally elongated nature of the illuminated volume the resolution can be substantially isotropic, with application of digital refocusing in both lateral axes so that larger volumes of the object can be constructed with high resolution by shifting the elongated illuminated area, preferably substantially perpendicularly to its long axis and with some overlap for co-registration of acquired data. The ability to access larger areas in a single frame reduces the number of frames required to image a given overall area of an object, thereby reducing the total acquisition time. Furthermore with a highly elongated illumination area it may only be necessary to scan the illumination in one dimension rather than two, simplifying the apparatus and the registration of individual snapshot images.

The techniques disclosed in WO 2021/151164 A1 allow the use of various broadband optical sources with a wide range of degrees of spatial coherence, from single spatial mode sources such as optical fibre-based supercontinuum sources or superluminescent light-emitting diodes (SLEDs), to partially spatially incoherent sources such as linear arrays of SLEDs or LEDs and even fully spatially incoherent sources such as laser-driven plasma, fluorescent or phosphorescent sources, optionally with spatial filtering to tune the degree of spatial coherence of light incident on the object. The use of low spatial coherence sources is generally advantageous for safety in in-vivo ocular examination because the emitted light cannot be focused to a small high-intensity spot on the retina. Furthermore, by selecting or controlling the spatial coherence of the illumination, multiply-scattered light can be suppressed while providing sufficient signal coherence for aberration correction and digital focusing.

In basic terms the 1-D sampling approach disclosed in WO 2021/151164 A1 trades speed for imaging depth, which is determined by the spectral bandwidth and number of resolvable wavelengths, allowing a larger area metric or resolution in a given acquisition time for a given 2-D sensor array. This reduction in imaging depth associated with a limited set of wavelengths can be countered by passing the light from the optical source through an etalon to increase its coherence length, but this is wasteful of source light. For example passing light through an etalon with a finesse of 100 will result in a 20 dB loss of power, reducing the available signal-to-noise ratio for light sources with limited output power.

Many of the important applications of OCT technology have been related to ocular imaging and in particular to imaging of the fundus over a wide field, which has proven to be a particular challenge due to the limited acquisition speed of scanning systems and their limited ability to register scans. This is especially apparent in OCT-A (Angiography) applications where time variation in an OCT signal is used as an indicator of blood flow. OCT-A systems need to perform repeated measurements over a typical time interval of a few milliseconds at each required location on the retina. This generally implies slow and uncomfortable acquisitions when covering a very wide field of the retina, say >75 degrees, often with compromised spatial resolution, as well as requiring extremely demanding registration of the scans to ensure that bulk motion of the eye is not misinterpreted as flow. Wide-field OCT-A images are hence prone to motion artifacts, often in the form of registration stripes.

Unless the context clearly requires otherwise, throughout the description and the claims the words 'comprising', 'comprises' and the like are to be construed in an inclusive sense as opposed to an exclusive or exhaustive sense. That is, they are to be construed in the sense of 'including, but not limited to'. Similarly, unless the context clearly requires otherwise, the word 'or' is to be construed in an inclusive sense rather than an exhaustive sense. That is, the expression 'A or B' is to be construed as meaning 'A, or B, or both A and B'.

OBJECT OF THE INVENTION

It is an object of the present invention to overcome or ameliorate at least one of the limitations of the prior art, or to provide a useful alternative. It is an object of the present invention in a preferred form to provide spectral domain OCT apparatus and methods for single shot acquisition of 3-D images of an object with extended imaging depth or more efficient utilisation of optical power.

SUMMARY OF THE INVENTION

According to a first aspect of the present invention there is provided an optical imaging apparatus comprising:

an illumination system comprising a multi-wavelength light source and a wavelength comb generator for illuminating a contiguous volume of an object with an extended illumination field comprising a plurality of linearly displaced combs of wavelengths selected from across a bandwidth of the light source, the volume to be imaged in three spatial dimensions;

one or more beam splitters for splitting light in the extended illumination field into a reference beam and a sample beam, and for combining the reference beam with light from the sample beam reflected or scattered from the illuminated volume of the object; and a measurement system comprising a spatial sampling element and a two-dimensional sensor array for simultaneous capture of phase and amplitude information, over a range of wavelengths in the linearly displaced plurality of combs of wavelengths, of the reflected or scattered light, wherein the measurement system is configured for far field sampling of the reflected or scattered light in a first dimension.

In certain embodiments the spatial sampling element and the two-dimensional sensor array are configured for far field sampling of the reflected or scattered light in the first dimension and for near field sampling of the reflected or scattered light in a second dimension. In certain embodiments the spatial sampling element and the two-dimensional sensor array are configured for sparse sampling of the reflected or scattered light in the first dimension and for dense sampling of the reflected or scattered light in a second dimension. In preferred embodiments the spatial sampling element and the two-dimensional sensor array are configured for far field sparse sampling of the reflected or scattered light in the first dimension at or near a Fourier plane and for near field dense sampling of the reflected or scattered light in a second dimension at or near an image plane. The first dimension preferably corresponds to a short axis of the extended illumination field.

In preferred embodiments the illumination system is configured such that the extended illumination field is substantially spatially coherent across the short axis of the extended illumination field. Preferably, the illumination system is configured such that the spatial coherence length of the extended illumination field in a long axis of the extended illumination field is less than the length of the extended illumination field in its long axis.

In certain embodiments the apparatus further comprises a scanning element for imposing a temporally modulated angular component on the extended illumination field.

Preferably, the apparatus further comprises a computer for processing the phase and amplitude information to construct a three-dimensional representation of the illuminated volume of the object.

According to a second aspect of the present invention there is provided an optical imaging method comprising the steps of:

illuminating a contiguous volume of an object with an extended illumination field comprising a plurality of linearly displaced combs of wavelengths selected from across a bandwidth of a multi-wavelength light source;

splitting light in the extended illumination field into a reference beam and a sample beam, and combining the reference beam with light from the sample beam reflected or scattered from the illuminated volume of the object; and simultaneously capturing, with a measurement system comprising a spatial sampling element and a two-dimensional sensor array, phase and amplitude information over a range of wavelengths in the linearly displaced plurality of combs of wavelengths, of the reflected or scattered light, wherein the reflected or scattered light is sampled in the far field in a first dimension.

In certain embodiments the reflected or scattered light is sampled in the near field in a second dimension. In certain embodiments the reflected or scattered light is sparsely sampled in the first dimension and densely sampled in a second dimension. In preferred embodiments the reflected or scattered light is sparsely sampled in the far field in the first dimension at or near a Fourier plane and densely sampled in the near field in a second dimension at or near an image plane. The first dimension preferably corresponds to a short axis of the extended illumination field.

In preferred embodiments the extended illumination field is substantially spatially coherent across the short axis of the extended illumination field. Preferably, the spatial coherence length of the extended illumination field in a long axis of the extended illumination field is less than the length of the extended illumination field in its long axis.

In certain embodiments the method further comprises the step of imposing a temporally modulated angular component on the extended illumination field. Preferably, the method further comprises the step of processing the phase and amplitude information to construct a three-dimensional representation of the illuminated volume of the object.

According to a third aspect of the present invention there is provided an optical imaging apparatus comprising:

an illumination system comprising a multi-wavelength light source and a wavelength comb generator for illuminating a contiguous volume of an object with an extended illumination field comprising a plurality of linearly displaced combs of wavelengths selected from across a bandwidth of the light source, the volume to be imaged in three spatial dimensions;

one or more beam splitters for splitting light in the extended illumination field into a reference beam and a sample beam, and for combining the reference beam with light from the sample beam reflected or scattered from the illuminated volume of the object; and a measurement system comprising a spatial sampling element and a two-dimensional sensor array for simultaneous capture of phase and amplitude information, over a range of wavelengths in the linearly displaced plurality of combs of wavelengths, of the reflected or scattered light, wherein the illumination system is configured such that the extended illumination field has spatial coherence across its short axis and the measurement system is configured such that the short axis of the illuminated volume of the object is sparsely sampled and projected across the sensor array, providing spatial resolution in the short axis of the illuminated volume.

Preferably, the measurement system is configured such that the short axis of the illuminated volume is sparsely sampled in the far field.

The illumination system is preferably configured such that the spatial coherence length of the extended illumination field in a long axis of the extended illumination field is less than the length of the extended illumination field in its long axis.

In certain embodiments the apparatus further comprises a scanning element for imposing a temporally modulated angular component on the extended illumination field.

Preferably, the apparatus further comprises a computer for processing the phase and amplitude information to construct a three-dimensional representation of the illuminated volume of the object.

According to a fourth aspect of the present invention there is provided an optical imaging method comprising the steps of:

illuminating a contiguous volume of an object with an extended illumination field comprising a plurality of linearly displaced combs of wavelengths selected from across a bandwidth of a multi-wavelength light source;

splitting light in the extended illumination field into a reference beam and a sample beam, and combining the reference beam with light from the sample beam reflected or scattered from the illuminated volume of the object; and simultaneously capturing, with a measurement system comprising a spatial sampling element and a two-dimensional sensor array, phase and amplitude information over a range of wavelengths in the linearly displaced plurality of combs of wavelengths, of the reflected or scattered light, wherein the extended illumination field has spatial coherence across its short axis and the short axis of the illuminated volume of the object is sparsely sampled and projected across the sensor array, providing spatial resolution in the short axis of the illuminated volume.

Preferably, the short axis of the illuminated volume is sparsely sampled in the far field.

In preferred embodiments the spatial coherence length of the extended illumination field in a long axis of the extended illumination field is less than the length of the extended illumination field in its long axis.

In certain embodiments the method further comprises the step of imposing a temporally modulated angular component on the extended illumination field.

Preferably, the method further comprises the step of processing the phase and amplitude information to construct a three-dimensional representation of the illuminated volume of the object.

According to a fifth aspect of the present invention there is provided an optical imaging apparatus comprising:

an illumination system comprising a spatially incoherent multi-wavelength light source, a spatial sampling element and a wavelength comb generator for illuminating a contiguous volume of an object with a spectrally structured extended illumination field comprising a plurality of extended illumination fields, each extended illumination field comprising a plurality of linearly displaced combs of a predetermined number of wavelength components selected from across a bandwidth of the light source, the volume to be imaged in three spatial dimensions;

one or more beam splitters for splitting light in the spectrally structured extended illumination field into a reference beam and a sample beam, and for combining the reference beam with light from the sample beam reflected or scattered from the illuminated volume of the object to form a two-dimensional interference pattern; and a measurement system comprising a dispersive element and a two-dimensional sensor array, wherein the dispersive element is configured to separate the two-dimensional interference pattern onto multiple discrete locations of the sensor array, according to the predetermined number of wavelength components in a comb of wavelengths.

The measurement system is preferably configured for simultaneous capture of phase and amplitude information, over a range of wavelengths in the linearly displaced plurality of combs of wavelengths, of the reflected or scattered light.

Preferably, the apparatus further comprises a computer for processing the phase and amplitude information to construct a three-dimensional representation of the illuminated volume of the object.

According to a sixth aspect of the present invention there is provided an optical imaging method comprising the steps of:

illuminating a contiguous volume of an object with a spectrally structured extended illumination field comprising a plurality of extended illumination fields, each extended illumination field comprising a plurality of linearly displaced combs of a predetermined number of wavelength components selected from across a bandwidth of a spatially incoherent multi-wavelength light source;

splitting light in the extended illumination field into a reference beam and a sample beam, and combining the reference beam with light from the sample beam reflected or scattered from the illuminated volume of the object to form a two-dimensional interference pattern; and separating the two-dimensional interference pattern onto multiple discrete locations of a two-dimensional sensor array, according to the predetermined number of wavelength components in a comb of wavelengths.

Preferably, the method further comprises the step of simultaneously capturing phase and amplitude information over a range of wavelengths in the linearly displaced plurality of combs of wavelengths, of the reflected or scattered light.

Preferably, the method further comprises the step of processing the phase and amplitude information to construct a three-dimensional representation of the illuminated volume of the object.

According to a seventh aspect of the present invention there is provided an optical imaging apparatus comprising:

an illumination system comprising a spatially incoherent multi-wavelength light source and a wavelength comb generator for illuminating a contiguous volume of an object with an extended illumination field comprising a plurality of linearly displaced combs of a predetermined number of wavelength components selected from across a bandwidth of the light source, said volume to be imaged in three spatial dimensions;

one or more beam splitters for splitting light in the extended illumination field into a reference beam and a sample beam, and for combining the reference beam with light from the sample beam reflected or scattered from the illuminated volume of the object to form a two-dimensional interference pattern; and a measurement system comprising a dispersive element and a two-dimensional sensor array, wherein the dispersive element is configured to separate the two-dimensional interference pattern onto multiple discrete locations of the sensor array, according to the predetermined number of wavelength components in a comb of wavelengths.

The measurement system is preferably configured for simultaneous capture of phase and amplitude information, over a range of wavelengths in the linearly displaced plurality of combs of wavelengths, of the reflected or scattered light.

Preferably, the apparatus further comprises a computer for processing the phase and amplitude information to construct a three-dimensional representation of the illuminated volume of the object.

According to an eighth aspect of the present invention there is provided an optical imaging method comprising the steps of:

illuminating a contiguous volume of an object with an extended illumination field comprising a plurality of linearly displaced combs of a predetermined number of wavelength components selected from across a bandwidth of a spatially incoherent multi-wavelength light source;

splitting light in the extended illumination field into a reference beam and a sample beam, and combining the reference beam with light from the sample beam reflected or scattered from the illuminated volume of the object to form a two-dimensional interference pattern; and separating the two-dimensional interference pattern onto multiple discrete locations of a two-dimensional sensor array, according to the predetermined number of wavelength components in a comb of wavelengths.

Preferably, the method further comprises the step of simultaneously capturing phase and amplitude information over a range of wavelengths in the linearly displaced plurality of combs of wavelengths, of the reflected or scattered light.

Preferably, the method further comprises the step of processing the phase and amplitude information to construct a three-dimensional representation of the illuminated volume of the object.

According to a ninth aspect of the present invention there is provided an article of manufacture comprising a computer usable medium having a computer readable program code configured to operate the apparatus of the first, third, fifth or seventh aspects, or to implement the method of the second, fourth, sixth or eighth aspects.

BRIEF DESCRIPTION OF THE DRAWINGS

Preferred embodiments of the invention will now be described, by way of example only, with reference to the accompanying drawings in which.

DETAILED DESCRIPTION OF THE INVENTION

Figure 1:
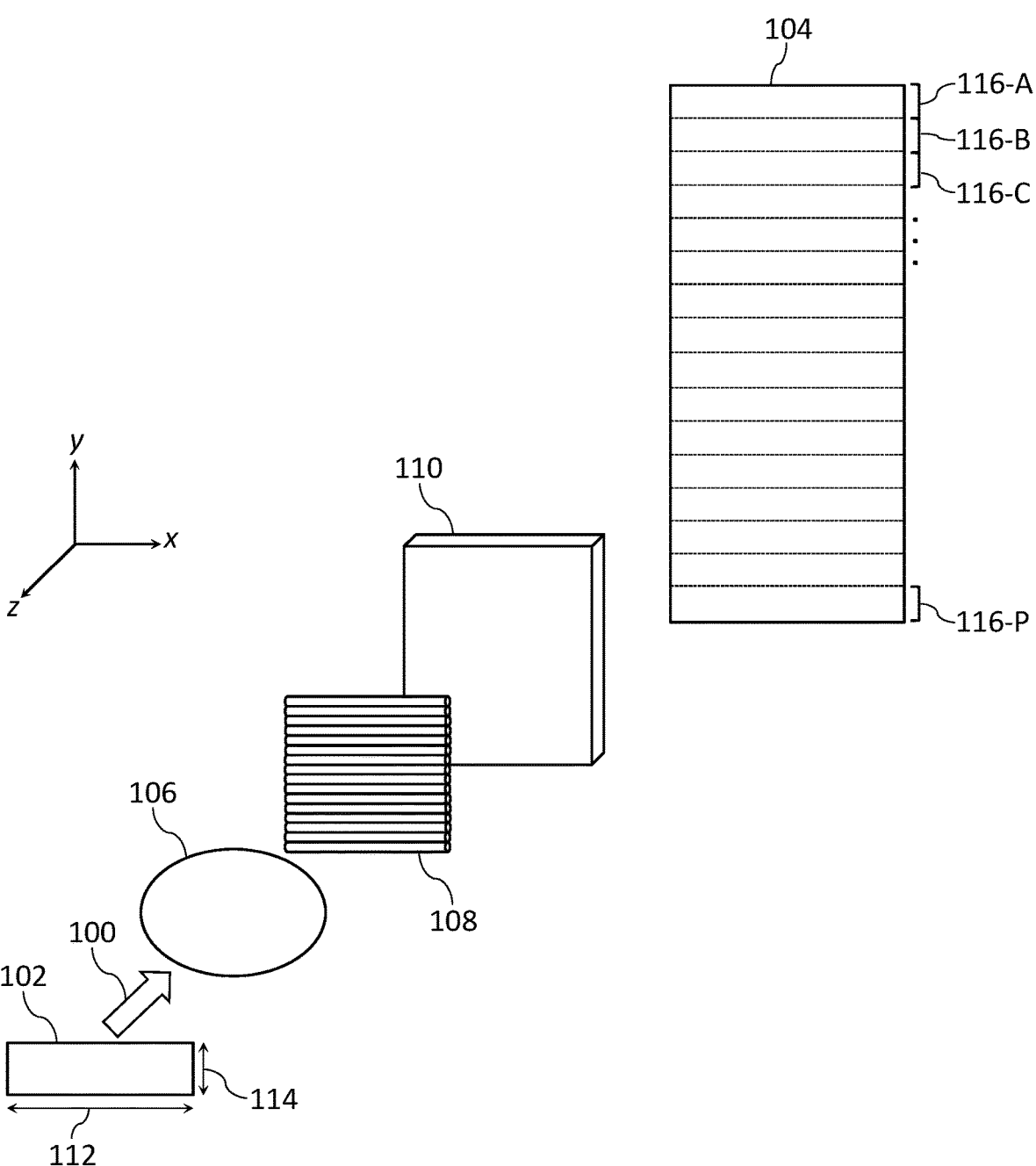
FIG. 1 illustrates in schematic oblique view an approach for mapping light reflected or scattered from an elongated illuminated volume of an object onto a 2-D sensor array.

As mentioned previously, published PCT patent application No WO 2021/151164 A1 discloses techniques and apparatus for snapshot tomographic imaging across an elongated volume of an object such as the retina of a human eye with resolution that can be provisioned to be substantially isotropic in two or three dimensions. FIG. 1 shows in schematic oblique view how light 100 reflected or scattered from an elongated illuminated volume of an object such as a retina, the illuminated volume having a cross-sectional area 102, can be mapped onto a two-dimensional (2-D) sensor array 104, using an optical system 106 illustrated for simplicity by a single lens, a 1-D spatial sampling element in the form of a cylindrical lenslet array 108 and a dispersive relay 110. Spatial sampling in one dimension may alternatively be provided by a linear aperture array or a combination of a lenslet array and an aperture array. As explained below, a suitable dispersive relay comprises a combination of lenses and a wavelength dispersive element such as a grating. The illuminated area 102, shown here as rectangular although it may be any regular or irregular elongated shape, has an aspect ratio defined by the ratio of a long axis 112 to a short axis 114. Depending on the details of the illumination source and optics, the aspect ratio of the illuminated area 102 may for example be at least ten, or at least twenty, or at least fifty, or at least one hundred.

In one specific example the illuminated area 102 is 9 mm×48 μm, corresponding to an aspect ratio of 187.5, and the 2-D sensor array 104 is a 3000×4000 (12 Mpixel) array with 4 μm square pixels. It is relatively straightforward to image the long axis 112 of the illuminated area 102 onto the corresponding (x) axis of the sensor array 104, with dispersion along the spectral (y) axis as in conventional line field OCT, to provide a lateral resolution of 3 μm in the x-axis (9 mm over 3000 pixels). However it is more challenging to obtain a snapshot C-scan with comparable resolution in the short axis 114 of the illuminated area 102. In several embodiments described in detail below, a cylindrical lenslet array 108 samples the reflected or scattered light 100 in a dimension substantially parallel to the short axis 114, with the optical system 106 configured to capture and anisotropically transform the reflected or scattered light 100. The anisotropic transformation preferably acts to reduce the aspect ratio of the captured light field such that its aspect ratio at the cylindrical lenslet array 108 is less than the aspect ratio of the elongated illuminated area 102.

The cylindrical lenslet array 108 may be positioned at or near an image plane of the optical system 106, for image plane sampling of the reflected or scattered light 100 in a first dimension, or more precisely at multiple positions in a first dimension, corresponding in this case to the y-axis. The dispersive relay 110 then disperses the segmented image onto separate sections of the 2-D sensor array 104. In the illustrated example a sixteen-element cylindrical lenslet array 108 samples the image in the y-axis for dispersion and projection onto separate sections 116-A, 116-B, 116-C . . . 116-P of the sensor array 104 as shown, effectively providing simultaneous acquisition of sixteen B-scans at the expense of a sixteen-fold reduction in depth range because of the reduced number of resolvable wavelengths per section 116 of the sensor array. However this image plane sampling approach requires the optical system 106 to have high magnification in the y-axis, which may be problematic in some applications, particularly where the cornea and intraocular lens of the eye contribute to the imaging of the reflected or scattered light 100.

Alternatively, high lateral resolution in the short axis 114 of the illuminated area 102 can be achieved for a spectral domain snapshot volume OCT imaging system, without requiring highly anisotropic image magnifying optics, by sampling the short axis 114 at a Fourier plane rather than at an image plane. In this case the cylindrical lenslet array 108 is placed at or near a Fourier plane of the optical system 106, converting lateral position along the short axis 114 to angle such that each section 116-A, 116-B . . . 116-P of the sensor array 104 receives information from across the short axis. That is, with Fourier plane sampling there is no 1:1 correspondence between the sections 116-A, 116-B . . . 116-P of the sensor array 104 and segments of the reflected or scattered light 100, unlike the case with image plane sampling.

Irrespective of whether the y-axis sampling is at a Fourier plane or an image plane, sampling of the reflected or scattered light 100 in the x-axis is provided by the pixels of the sensor array 104. This x-axis sampling may be at or near a Fourier plane or an image plane, depending among other things on the configuration of the optical system 106, and is a dense sampling, i.e. a per-pixel sampling, unlike the sparse sampling at the cylindrical lenslet array 108 where each lenslet directs light onto multiple pixels of the sensor array 104. For efficient use of the 2-D sensor array 104 the optical system 106 and cylindrical lenslet array 108 are preferably configured such that the reflected or scattered light 100 is projected onto a substantial portion of the 2-D sensor array, generally with some margin for relaxed alignment tolerance. High-speed 2-D sensors with a large pixel count, e.g. multi-Mpixel sensors, enable capture of a large amount of data in a single frame, either with a global shutter or a rolling shutter. To maximise the amount of data captured in a single frame it is preferable to utilise a substantial portion of the 2-D sensor array 104, i.e. to have a high pixel count in both dimensions. In state of the art visible or near IR light sensors this could mean projection onto at least 2000 pixels per dimension, but in any case it is expected that for various types of 2-D sensors more than 100 pixels per dimension would be utilised.

Figures 2A, 2B:
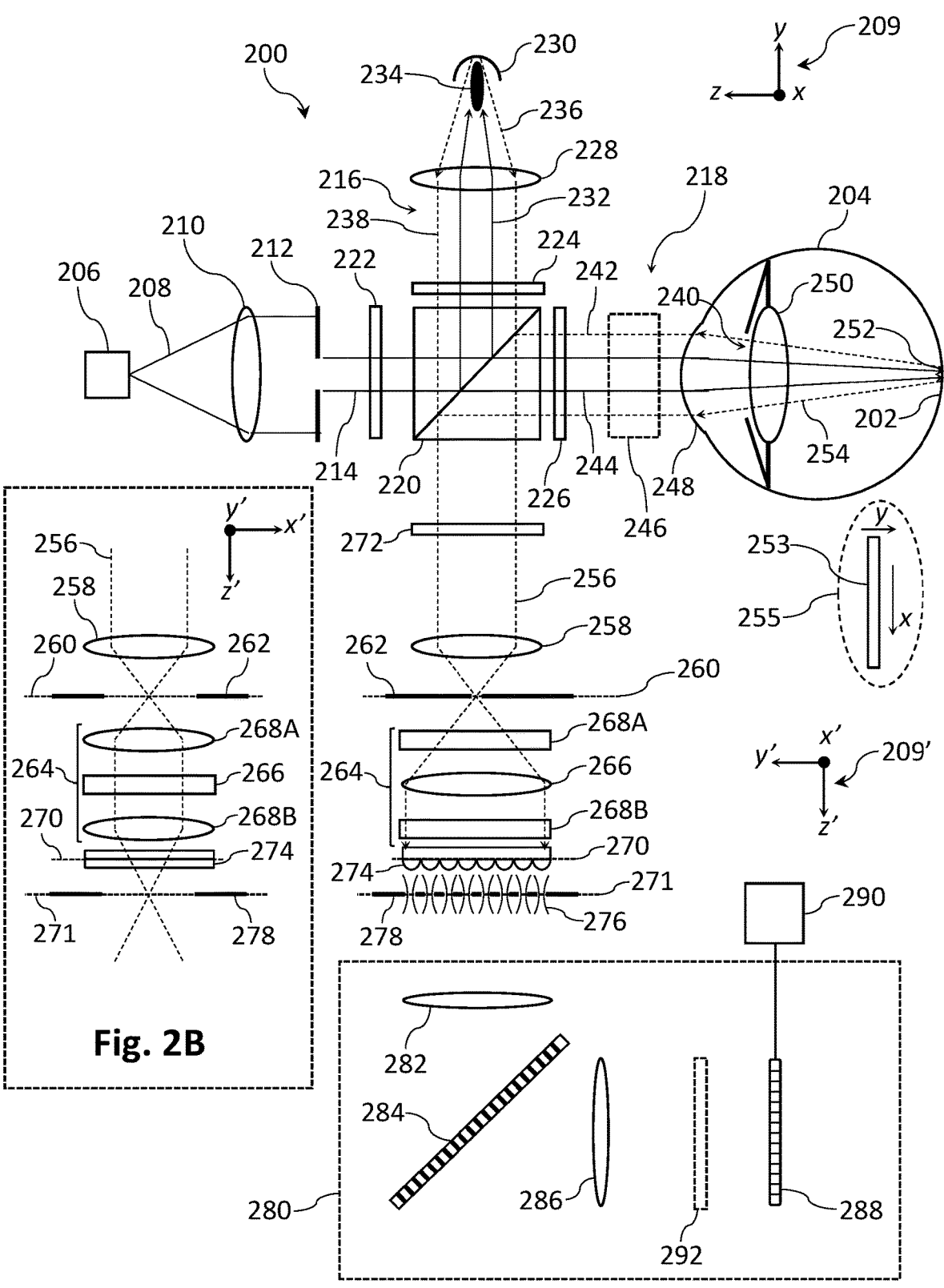
FIG. 2A shows in schematic plan view an optical imaging apparatus for in-vivo tomographic imaging of the retina of a human eye.
FIG. 2B depicts a portion of the apparatus shown in FIG. 2A in an orthogonal plane.

FIG. 2A shows in schematic plan view an optical imaging apparatus 200 for in-vivo tomographic imaging of the retina 202 of a human eye 204. The apparatus 200 comprises a broadband line source 206 emitting a multi-wavelength beam of light 208 elongated in the x-axis, i.e. into the page, as defined by the Cartesian axes 209. The line source 206 may be a spatially coherent source, e.g. a single spatial mode source such as an optical fibre-based supercontinuum source or a superluminescent light emitting diode (SLED) with appropriate anamorphic or astigmatic lensing. Preferably however the source 206 is a partially spatially incoherent source such as a high-power semiconductor gain medium having a stripe configuration, where feedback has been suppressed by antireflection coatings or angled facets allowing the gain medium to be driven below lasing threshold to produce broadband or partially spectrally incoherent light. The use of low spatial coherence sources is generally advantageous for safety in in-vivo ocular examination because the emitted light cannot be focused to a small high-intensity spot on the retina. Other suitable partially spatially incoherent line sources include linear arrays of SLEDs, LEDs or wavelength-broadened VCSELs or laser diodes. In some embodiments a partially spatially incoherent source is provided by scanning one or more spatially coherent sources, such as an array of SLEDs, along the x-axis to create an elongated source. Within a single acquisition frame of a 2-D sensor array 288 the temporal incoherence between the different source positions achieves a degree of virtual spatial incoherence. Advantageously, this source scanning scheme allows a longer exposure time without fringe washout, and hence the use of lower peak power sources for the same average power.

The line source 206 may also be fully spatially incoherent, derived for example from laser-driven plasma, fluorescent or phosphorescent sources that may be confined within a single mode planar waveguide and pumped by another light source. When the object being imaged is an eye 204 as shown, the apparatus 200 will typically have a source 206 emitting light in the visible or near infrared regions of the electromagnetic spectrum. However this is not a limitation and in general light sources emitting in the ultraviolet, visible or infrared regions of the electromagnetic spectrum may be used depending on the application. An etalon may be included to extend the coherence length of the light emitted from the line source 206, albeit at the expense of significant wastage of source power as explained previously.

The elongated beam 208 emitted from the source 206 is collimated by a spherical lens 210 with focal length of, say, 20 mm, then passed through an optional aperture 212 that restricts the numerical aperture (NA) of the lens 210 and hence the minimum diffraction limited spot size that can be created if the apertured beam 214 is subsequently focused with a lens of a given focal length. The size of the aperture 212 can also be chosen to adjust the spatial coherence of the beam 208, with a smaller aperture generally increasing the spatial coherence of the transmitted light 214. The aperture 212 may for example be circular. Alternatively the aperture may be rectangular, so as to restrict the beam 214 to different extents in the x- and y-axes.

The apertured source beam 214 is split into a reference path 216 and a sample path 218 with a beam splitter 220. In the illustrated example the beam splitter 220 is a polarisation beam splitting cube that splits the apertured source beam 214 according to the relative angle of the beam's polarisation state, which may be set by a polarising element 222. A power beam splitter may be used instead, although the combination of a polarisation beam splitter 220 and quarter wave plates 224, 226 is generally less wasteful of source light.

The reference path 216 comprises an optical power element 228 in the form of a lens and a curved reflective element 230. The optical power element 228 focuses the collimated beam 232 to a waist 234 that may for example be 100 μm by 20 mm. The curved reflective element 230 may be a short focal length cylindrical mirror that transforms the beam waist 234 in its short axis to be an angularly divergent beam 236. This divergent beam is collimated by the lens 228 to form a reference beam 238 of comparable dimension to a dilated pupil 240, suitable for mixing with the returning sample beam 242 as described below. For applications where shaping of the reference beam 238 is not required, the lens 228 and curved reflective element 230 may be replaced by a planar mirror.

Multi-wavelength light 244 in the sample path 218 is directed to the eye 204, preferably by a 4F lens relay system 246 which may have focusing and angular beam steering capabilities as described for example in published US patent application No US 2019/0223729 A1 entitled 'Apparatus and method for confocal microscopy using dispersed structured illumination', the contents of which are incorporated herein by reference. The combined focusing power of the cornea 248 and intra-ocular lens 250 transforms the multi-wavelength sample beam 244 to a laterally elongated beam waist that illuminates a volume 252 of the retina 202, with an elongated cross-sectional area 253 as shown in the inset view 255. The illuminated area 253 on the retina, i.e. the beam waist dimensions, will generally be of order tens of microns by several millimetres in the y- and x-directions respectively, for example 50 μm×3 mm corresponding to an aspect ratio of sixty. The illuminated area 253 may be substantially rectangular or elliptical in shape, or any other elongated shape with a longer dimension significantly larger than a shorter dimension. With a partially spatially incoherent line source 206 the light at the beam waist may be relatively coherent across the shorter dimension, but coherent across only a small distance, e.g. 50 μm, in the longer dimension. On the other hand if the light is derived from a single spatial mode source 206 the projection onto the retina 202 will be coherent in both axes but will still have a highly elongated shape, e.g. 50 μm×3 mm. Noting again the influence of the aperture 212 on the spatial coherence of the sample beam 244, it is preferable for there to be some coherence across the long axis of the illuminated area 253 to allow digital refocusing.

Light 254 will be reflected or scattered from the illuminated volume 252 of the retina 202 in a large range of angles and can be captured within an angular range determined by the size of the dilated pupil 240, with the larger numerical aperture components enabling higher resolution imaging of the retina 202. The reflected or scattered light 254 will be collimated, at least for the case of an emmetropic eye, by the intra-ocular lens 250 and cornea 248 to form a returning sample beam 242. A polarisation component of this returning sample beam is reflected by the polarisation beam splitter 220, forming a return beam 256 with the substantially overlapping reference beam 238. At this point the returning sample beam 242 and reference beam 238 are orthogonally polarised so will not interfere until they are analysed by a polariser 272. Since the reflectivity of the retina 202 will generally be significantly less than that of the reference arm mirror 230, it is usually advantageous for the polariser 272 to be oriented to pass a larger fraction of the returning sample beam 242 and a smaller fraction of the reference beam 238. If on the other hand the sample and reference paths 218, 216 are split and recombined with a power beam splitter the returning sample beam 242 and reference beam 238 will interfere as soon as they are recombined.

A spherical lens 258 images the illuminated area 253 of the retina 202 to an image plane 260 where there is positioned a linear, i.e. slit-shaped, aperture 262 for excluding light which has been multiply-scattered or is from the edges of the illuminated volume 252.

Light passing through the aperture 262 proceeds to an anisotropic relay system 264 of cylindrical lenses, the operation of which is described with reference to a set of Cartesian axes 209' rotated with respect to the Cartesian axes 209 to account for the redirection at the beam splitter 220. For ease of explanation the relay system 264 and surrounding optics are also illustrated in the orthogonal (x'z') plane in FIG. 2B. The relay system 264 comprises a first cylindrical lens 266 of focal length 2f for focusing in a first axis (the y'-axis) and a pair of cylindrical lenses 268A, 268B of focal length f for focusing in a second axis (the x'-axis). The first cylindrical lens 266 is positioned at a distance from the aperture 262 equal to its focal length 2f and acts to collimate the return beam 256 in the first axis, i.e. the short axis of the aperture 262. The pair of cylindrical lenses 268A, 268B act to collimate then refocus the light from the aperture 262 in the second axis, i.e. the long axis of the aperture 262. The first cylindrical lens 266 therefore forms a 2F relay system in the first axis while the cylindrical lenses 268A, 268B form a 4F relay system in the second axis, such that the plane 270 is a Fourier plane for light in the first axis and the plane 271 is an image plane for light in the second axis. The plane 271 is preferably displaced from the plane 270 by an optical equivalent distance determined by approximately twice the focal length of the lenslets in a cylindrical lenslet array 274 placed at or near the plane 270.

The cylindrical lenslet array 274 forms a spatial sampling element for sparse sampling of the return beam 256 at multiple positions in a first dimension that corresponds to the y' axis, i.e. the axis for which the plane 270 is a Fourier plane, effectively sampling the return beam from different parts of the far field. The resulting array of focused lines 276 pass through an array of linear apertures 278 placed at or near the plane 271 before proceeding to a measurement system 280 for simultaneous measurement of phase and amplitude information over a range of wavelengths of the captured return beam 256 sampled by the cylindrical lenslet array 274. By selecting or controlling the spatial coherence of the illumination, multiply-scattered light can be suppressed while providing sufficient signal coherence for aberration correction and digital refocusing. This scheme is advantageous in that it is able to physically separate the wavefront measurements of numerous sample regions that are each illuminated by light that is not spatially coherent, to generate a full volume SD-OCT image while avoiding the noise penalties and sensitivity loss that would occur if the incoherent signals were captured overlapping on the same set of pixels. The measurement system 280 comprises a collimating lens 282, a dispersive element 284 and a focusing lens 286 that creates dispersed line arrays for detection at a 2-D sensor array 288. In the illustrated example the dispersive element 284 is a transmissive grating, but in other embodiments it may for example be a prism, a reflective grating or a combination of a prism and a grating.

The relay system 264 of cylindrical lenses and the spherical lens 258 form an optical system configured to cooperate, when in use, with the optical power elements 248, 250 of the eye 204 for capturing and anisotropically transforming light 254 reflected or scattered from the illuminated volume 252 of the retina 202. It will be appreciated that this optical system could be reconfigured for imaging other structures in the eye 204, such as the intraocular lens 250 or the cornea 248. Preferably, the anisotropic transformation serves to increase the spatial extent of the captured light in the first axis, corresponding to the short axis of the illuminated area 253, relative to the second axis, so that the aspect ratio of the captured light at the cylindrical lenslet array 274 is less than the aspect ratio of the illuminated area 253. In the illustrated example the spatial extent of the captured light in the first (short) axis is determined by appropriate choices of the focal lengths of the spherical lens 258 and cylindrical lens 266. In the illustrated example the far field at the dilated pupil 240 is expanded by a factor of two onto the cylindrical lenslet array 274, e.g. from 8 mm to 16 mm, by choosing the focal length of the spherical lens 258 to be half that of the cylindrical lens 266. It should be noted however that in this example an anisotropic transformation of the reflected or scattered light is ensured by the fact that the reflected or scattered light is sparsely sampled at or near a Fourier plane in a first dimension and densely sampled at or near an image plane in a second dimension, by the cylindrical lenslet array 274 and the pixels of the 2-D sensor array 288 respectively. It should be understood that when imaging a volume of an object, each depth corresponds to a far field with different curvature, so that the cylindrical lens 266 will only create a flat wavefront with captured light from one specific depth in the object. Similarly, there will only be one specific depth that can be exactly focused at an image plane. Our use of the terminology 'at or near a Fourier plane' or 'at or near an image plane' is indicative of this observation.

In one particular example the 2-D sensor array 288 is a high-speed Flash 4K 4000×1000 pixel sensor from Teledyne Technologies, Inc, capable of operating at 1800 frames per second (fps). With a 16-element cylindrical lenslet array 274 sparsely sampling the return beam 256 at or near a Fourier plane, and with 200 wavelengths per sample for dispersion along the 4000-pixel axis of the sensor array 288, the apparatus 200 can provide the equivalent of 16×1000×1800 A-scans per second. This equates to 28.8 M A-scans per second, which is approximately 100 times faster than the fastest currently available spectral domain OCT systems, which offer around 250k to 300k A-scans/sec. In another example the 2-D sensor array 288 is a 12Mpixel (4000× 3000) sensor providing 3000×16=48k A-scan equivalent resolution per frame, so that even a moderately low speed sensor, with a frame rate of say 60 Hz, could provide nearly 3 M A-scans per second, enabling low-cost but high-speed retinal imaging.

Phase and amplitude data acquired with the 2-D sensor array 288 are processed with a computer 290 equipped with suitable machine-readable code to recover the retinal image at high resolution over a range of depths, e.g. with an on-retina pixel size of approximately 3×3 microns. Even over a small range of axial depths the line scan images will often become defocused along their length, necessitating some form of corrective processing such as digital refocusing.

Noting that the light 254 reflected or scattered from the retina 202 has been sampled at or near a Fourier plane in a first dimension and at or near an image plane in a second dimension, by the cylindrical lenslet array 274 and the pixels of the 2-D sensor array 288 respectively, one approach to processing the data will be described with reference to FIG. 1.

In a first step, phase and amplitude data from each of the sections 116-A . . . 116-P of the 2-D sensor array 104, which may for example have 200 resolvable wavelengths in the dispersive (y) axis, are Fourier transformed in the dispersive axis to transform from wavelength to axial depth, then Fourier transformed in the x-axis so that the data in both axes is now in the Fourier domain, i.e. the optical far field. We now have the complete volume 3-D Fourier information. In a second step the data is convolved with a focusing or aberration function, which may be termed a 'digital adaptive optics function', or 'DAO function', that can be determined iteratively for each depth to be visualised. In certain embodiments the choice of focusing or aberration function is determined analytically or iteratively by using an image focus metric or 'guide star' as may be provided by the reflections off individual cones in the retina. Finally, for each depth and choice of DAO function the 3-D data set is Fourier transformed to recreate the desired focal plane as is known in the art. In general the resulting image will be a representation of an optical characteristic of the retina, such as phase, reflectivity, refractive index, refractive index changes and attenuation over the illuminated volume 252. If the apparatus 200 is configured for polarisation diverse detection, e.g. with the addition of a polarisation separation element such as a walk-off plate 292 between the focusing lens 286 and the 2-D sensor array 288, the optical characteristic may be birefringence or degree of polarisation.

To image larger regions of the retina 202, beam steering optics in the lens relay system 246 can move the illuminated volume 252 to one or more adjacent or nearby locations, preferably with some overlap for co-registration of acquired data, and preferably in a direction substantially perpendicular to the long axis of the illuminated area 253, i.e. in a direction substantially parallel to the y-axis. A tomographic image of an extended volume of the retina 202 can thereby be constructed from the series of snapshot acquisitions in an approach similar to the line field holoscopy technique described in published US patent application No 2014/0028974 A1, but with the significant advantage that high resolution is maintained in both lateral dimensions. Consequently the full volume will have high resolution in both lateral dimensions even in the presence of lateral or axial shifts between adjacent snapshot acquisitions. Preferably the apparatus 200 is configured so that the resolution is substantially isotropic in both lateral dimensions.

For OCT-A applications the apparatus 200 can be configured for capture of phase and amplitude information in two or more sequential frames of the sensor array 288 at a given location on the retina 202, optionally with pulsing of the source 206, for processing in the computer 290 to allow measurement of changes due to blood flow in the illuminated volume 252. A frame rate of 300 Hz for example would provide a 3.33 ms delay between frames, suitable for robust measurement of changes due to blood flow, whereas the eye motion will be small enough for there to be a significant overlap volume between the sequence of frames to allow co-registration and subtraction of the bulk eye motion. The process can be repeated at additional locations on the retina 202, preferably with partial overlap for registration, for measuring blood flow in larger portions of the retina. In other embodiments the motion in the y-axis of the illumination between each frame can be small compared to the y-dimension of the illuminating beam such that an overlap region of the reconstructed volume can be used for determining the blood flow in a volume or projection image of the retina for example.

Figure 3:
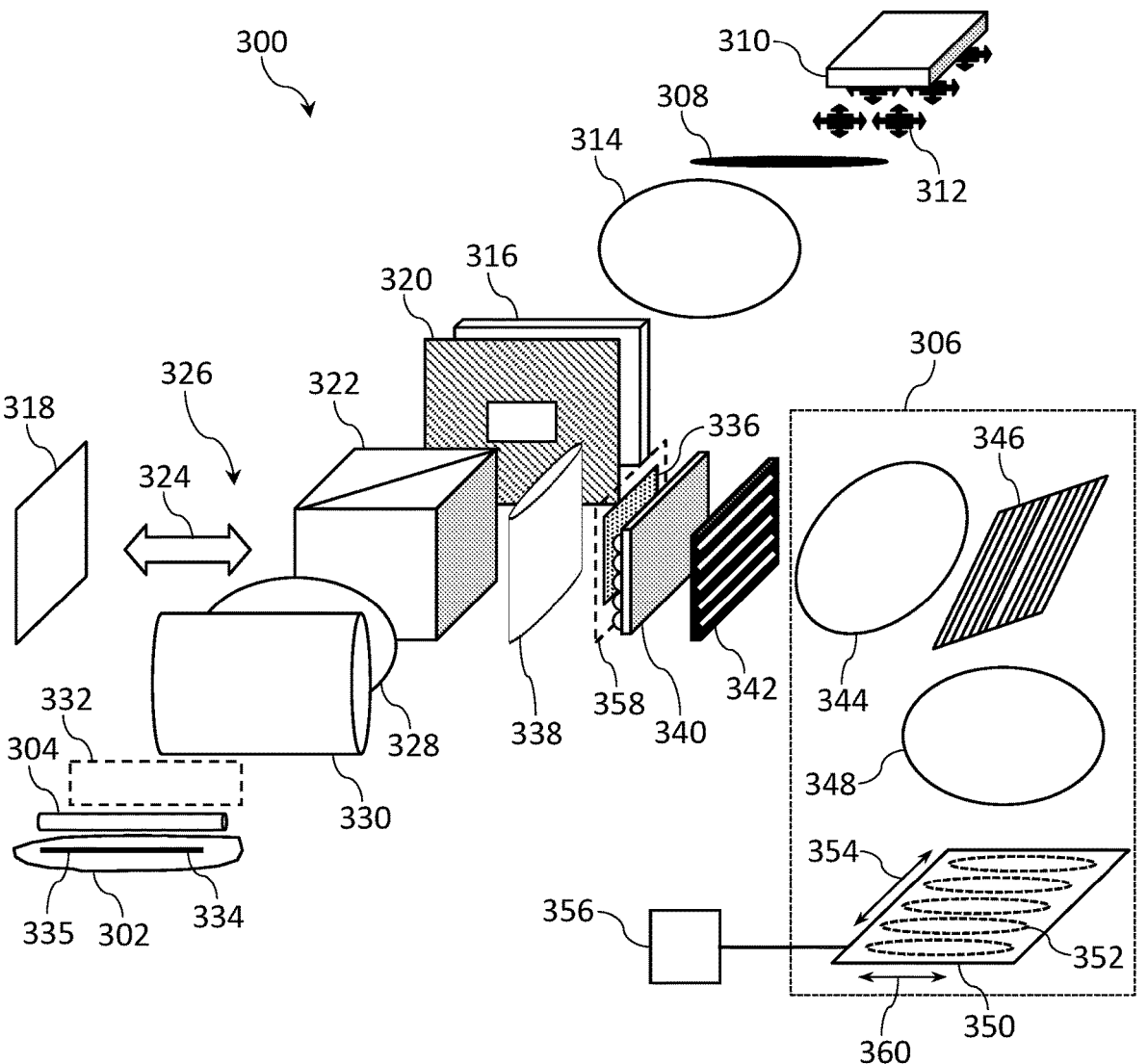
FIG. 3 shows in schematic oblique view an optical imaging apparatus.

FIG. 3 shows in schematic oblique view an optical imaging apparatus 300 for imaging an object 302, which may for example be the cornea of an eye or a non-ocular biological sample. In this example an anisotropic magnification of the focal plane of a cylindrical objective lens 304 onto a 2-D spectrometer 306 enables a cylindrical lenslet-based optical system to image a contiguous volume of the object 302. A highly asymmetric beam 308 of spatially incoherent and partially spectrally incoherent light is generated from a thin plate 310 of a phosphor crystal such as Ce-YAG pumped by an array of blue LEDs 312. Incoherent light from the phosphor ions is collimated by an optical power element 314, shown here as a lens but which could equally be a concave mirror, and the resultant beam passed through an optional Fabry-Perot etalon 316 to extend the coherence length of the individual spectral components, albeit at the expense of significant wastage of source power. In one particular example a Fabry-Perot etalon 316 with a free spectral range of 200 GHz and a finesse of 20 may be chosen to yield a bandwidth of approximately 10 GHz in each spectral bin to provide improved tolerance for length matching the coherent interference provided by a reference mirror 318. An aperture 320 may be included to provide a desired level of spatial coherence at the object 302, with a smaller aperture providing greater spatial coherence, and hence range of digital refocusing, at the expense of reduced intensity.

A portion of the apertured light is reflected by a beam splitter 322 to form a reference beam 324, which is reflected by a mirror 318. The illustrated example utilises a power beam splitter 322, although a polarisation beam splitter could be used instead. Additional elements or features may be included in the reference arm 326, e.g. shaping of the reference mirror 318 to ensure optimal overlap with the returning sample light when being redirected towards the spectrometer 306. Source light that passes undeflected through the beam splitter 322 is directed to a combination of a spherical lens 328 and a relatively weak cylindrical lens 330 to provide focusing in one axis at a focal plane 332 of a short focal length cylindrical lens 304 such as a rod lens, illuminating a volume 334 having a highly elongated cross-sectional area 335. In one particular example the combination of a spherical lens 328, cylindrical lens 330 and rod lens 304 with respective focal lengths of 50 mm, 500 mm and 2 mm produces an illuminated area 335 of 200 μm×12 mm on the object 302, corresponding to an aspect ratio of sixty.

Light reflected or scattered from the illuminated volume 334 of the object 302 is captured and anisotropically transformed with an optical system comprising a cylindrical lens 338 in addition to the lenses 304, 330 and 328, and relayed via the beam splitter 322 where it mixes with the reference beam 324. In the illustrated example this optical system magnifies the captured light to different extents in the short and long axes of the illuminated area 335, with the cylindrical lens 338 and the spherical lens 328 providing magnification in the long axis of the illuminated area 335. Magnification in the orthogonal short axis is provided by the ratio of the focal length of the combined lens 328, 330 to the focal length of the cylindrical objective lens 304. In one particular example a 25× magnification can be provided by a focal length ratio of 50 mm to 2 mm, enabling a 200 μm wide short axis to be magnified to a 5 mm wide image 336 that can be sparsely sampled with a spatial sampling element in the form of a cylindrical lenslet array 340 and a linear aperture array 342. Preferably the apparatus is configured such that the lenslet array 340 is at or near a short axis image plane 358, while the aperture array 342 is at or near a long axis image plane.

Light passed by the aperture array 342 proceeds to a 2-D spectrometer 306 comprising a collimating lens 344, a grating 346, a focusing lens 348 and a 2-D sensor array 350, for simultaneous measurement of phase and amplitude information over a range of wavelengths. Portions of the image 336 sampled by the cylindrical lenslet array 340 in the direction corresponding to the short axis of the illuminated area 335 are dispersed onto separate portions 352 of the 2-D sensor array 350 separated in the dispersive axis 354, with columns of pixels in the orthogonal direction 360 providing lateral resolution in the long axis of the illuminated area 335. In one particular example, with a 12Mpixel (4000×3000)

sensor array 350, the magnified image 336 of the 200 μm wide short axis of the illuminated area 335 is sparsely sampled with a forty-element cylindrical microlens array 340 to provide a lateral resolution of 5 μm in that axis, while the 12 mm long axis is projected across 3000 pixels of the 2-D sensor array 350 to provide a lateral resolution of 4 μm in the long axis of the illuminated area 335.

Phase and amplitude data acquired with the 2-D sensor array 350 can then be processed with a computer 356 equipped with suitable machine-readable code to recover depth-resolved information with lateral resolution in two axes across the illuminated volume 334. The processing differs from that described for the apparatus 200 of FIG. 2A because the holoscopy information is now in the image plane in both axes, with lines from the cylindrical lenslets 340 corresponding to spatial pixels in the short axis of the illuminated area 335. In one approach the data set read out by the computer 356 is Fourier transformed and relevant aberration or focus corrections applied to provide a high-resolution image throughout the whole illuminated volume 334. This scheme is likely to be advantageous for objects where the imaging depth requirement, and hence the number of wavelengths required, is quite limited, so the anisotropic imaging ratio is not too high for a practical optical design without overly large focal length requirements, advantageous for a compact apparatus.

The apparatus 300 may be advantageously applied to scanning applications where the apparatus is translated relative to the object 302 by moving the apparatus or the object. For example handheld instruments for scanning of skin for assessing burns or skin conditions such as melanoma can benefit hugely from the high-speed acquisition of volume information with post-processing of the focusing. Because of the reduced number of wavelengths that need to be captured per sampling point, the apparatus can be sufficiently compact for handheld use. It is in fact the digital refocusing that provides the opportunity to use a smaller number of wavelengths, as the apparatus does not rely solely on the coherence gate to provide depth resolution. Instead, the coherence gate is used in combination with digital refocusing to extend the range of imaging depth beyond the Nyquist range that would otherwise be offered by a limited set of wavelengths, with the extended depth range related to the extended coherence length provided by the etalon 316. We note that the wavelength filtering provided by the etalon will generally be non-uniform across the illuminated volume 334 because of the range of emission angles from the phosphor ions in the light source 310, however this can be calibrated across the beam to ensure accurate scaling of the axial depth.

In an alternative example the cylindrical lens 338 is omitted, in which case the pixels of the sensor array 350 will sample the reflected or scattered light in the far field rather than the near field. This situation, where the sampling is in the near field (e.g. image plane sampling) in the short axis and in the far field (e.g. Fourier plane sampling) in the orthogonal long axis, is similar to the situation depicted in FIG. 2A, except the axis of focusing and the Fourier plane have been swapped relative to the dispersive axis 354.

Figure 4:
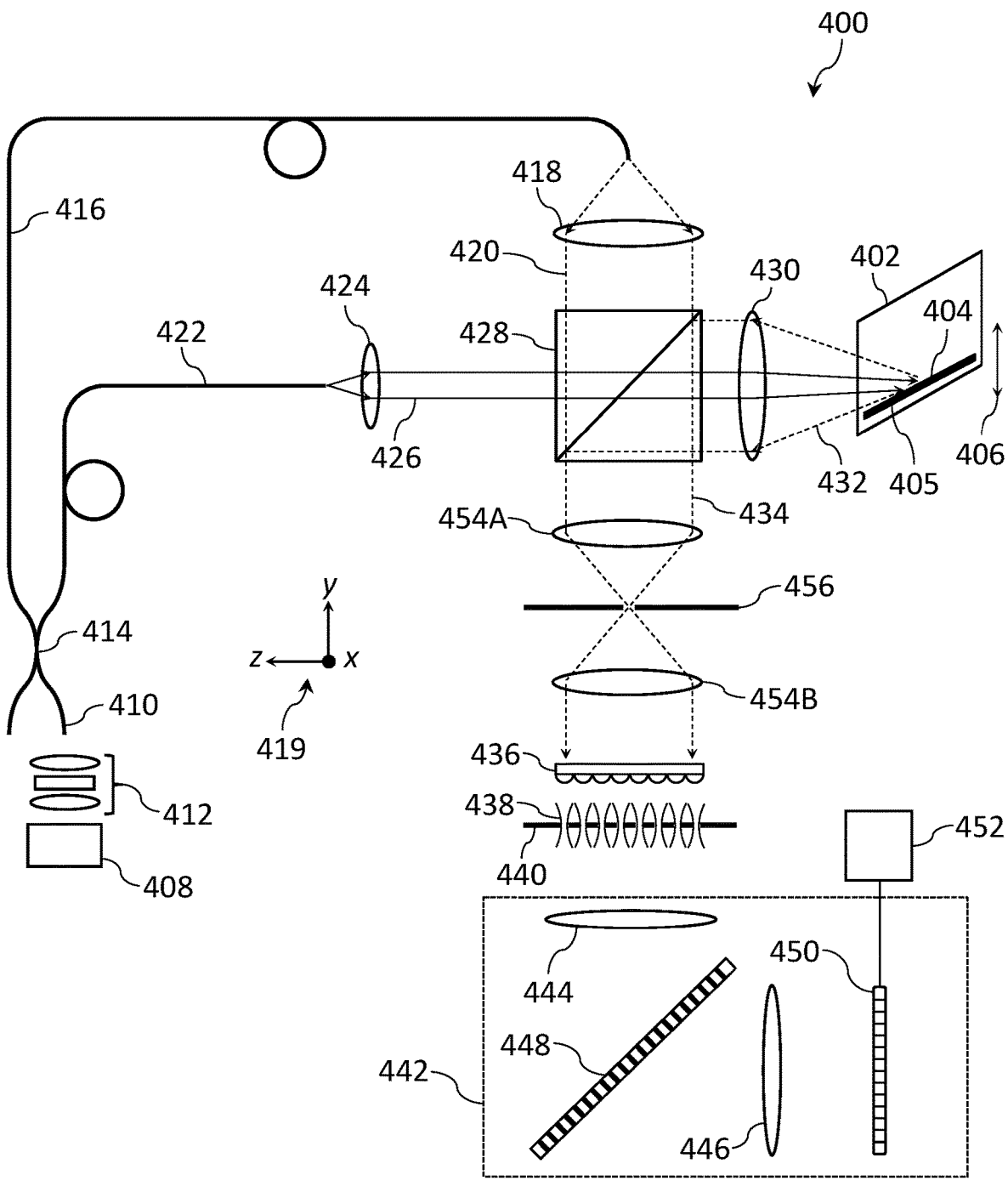
FIG. 4 illustrates in schematic plan view an optical imaging apparatus.

FIG. 4 shows in schematic plan view an optical imaging apparatus 400 with which relatively large areas or volumes of an object 402 such as a cornea or a non-ocular biological sample can be imaged by scanning an elongated illuminated area 405 in a direction 406 substantially parallel to its short axis. The scanning may for example be effected by lateral translation of the object or by angular scanning of a beam-steering mirror. In this example apparatus a cylindrical lenslet array 436 provides sparse far field sampling of reflected or scattered light 432 in a first dimension substantially parallel to the short axis of the illuminated area 405, with dense far field sampling in a second dimension substantially parallel to the long axis provided by the pixels of a 2-D sensor array 450. The aspect ratio of the illuminated area 405 may for example be at least ten. The ability to image relatively large volumes of an object 402 with scanning in only one axis, rather than in two axes as in the substantially symmetrical sampling techniques disclosed in the above-mentioned US 2016/0345820 A1, simplifies the optics, which is advantageous for low cost and handheld applications.

The apparatus 400 utilises a spatially coherent but spectrally incoherent light source 408 such as a supercontinuum source coupled to an optical fibre 410. A fibre-coupled source is advantageous for handheld applications because it can be located remotely from the remainder of the instrument. In the illustrated embodiment a fibre-coupled etalon filter 412 is included to pass a comb of wavelengths within a wavelength range of the light source 408, so as to extend the coherence length for each of the wavelengths in the comb, albeit at the expense of significant wastage of source power. A fraction of the light from the source 408 is split off by a 2×2 fibre coupler 414 into a reference arm 416 and focused in one dimension by a cylindrical lens 418 to provide a reference beam 420 that is collimated in the z-axis (as defined by the Cartesian axes 419) but divergent in the x-axis. Alternatively the lens 418 may be a composite lens selected to provide different focusing in the z- and x-axes. The remainder of the source light is directed into a sample arm 422 and collimated in the y-axis by a cylindrical lens 424 to provide a sample beam 426 incident on a beam splitter 428, depicted here as a power beam splitter although a polarisation beam splitter may be used. The sample light transmitted through the beam splitter 428 is focused in the y-axis and collimated in the x-axis by action of a spherical lens 430 to illuminate a volume 404 of the object 402, with the volume having a highly elongated cross-sectional area 405. For clarity the object 402 and the elongated illuminated area 405 are depicted in oblique view, with the short and long axes of the illuminated area parallel to the y- and x-axes respectively.

The dimensions of the illuminated area 405 are determined by the numerical aperture of the optical fibre 410 and the focal lengths of the spherical lens 430 and cylindrical lens 424. For example the combination of an optical fibre 410 of numerical aperture 0.1, a cylindrical lens 424 of focal length 2 mm and a spherical lens 430 of focal length 50 mm will provide an illuminated area 405 of approximately 200 μm×10 mm, corresponding to an aspect ratio of fifty. One or more apertures may be included in the optical train to create a sharp rectangular illumination profile rather than the Gaussian profile of a singlemode optical fibre.

While the elongated illumination profile is incident on the object 402 with a relatively low numerical aperture, light 432 is reflected or scattered from the illuminated volume 404 over a much larger cone of angles. The reflected/scattered spherical wavefronts are collimated by the lens 430 and reflected at the beam splitter 428 where they interfere with the reference beam 420. The interference pattern 434 proceeds via a lens relay comprising a spherical lens 454A, a linear aperture 456 and a lens assembly 454B to a spatial sampling element in the form of a cylindrical lenslet array 436, where it is sparsely sampled in the far field in a first dimension corresponding to the short axis of the illuminated area 405, based on the pitch of the lenslet array 436. The lens assembly 454B may for example comprise an assembly of cylindrical lenses 264 as shown in FIGS. 2A and 2B, or a combination of spherical and cylindrical lenses. The lens relay 454A, 454B, in combination with the lens 430, forms an optical system for capturing and anisotropically transforming light 432 reflected or scattered from the illuminated volume 404.

The linear beamlets 438 produced by the sparse sampling at the cylindrical lenslet array 436 are projected onto a linear aperture array 440 for rejection of light from angles not corresponding to the illuminated volume 404, e.g. multi-scattered light, to provide a well-defined image for analysis in a spectrometer 442, for obtaining phase and amplitude information over a range of wavelengths. As in the previous examples the spectrometer comprises lens relay elements 444, 446 and a wavelength dispersive element 448 shown here as a grating. Alternatively, the dispersive and optical power elements can be combined, e.g. in the form of a chirped grating where the variation in grating spacing can provide the optical power for focusing. The wavelength dispersed re-imaging of the aperture array plane onto a 2-D sensor array 450 now provides a Fourier plane interference for each of the different wavelengths, for analysis in a computer 452 using methods described for the Fourier plane sampling embodiments in US 2016/0345820 A1. The use of an etalon 412 to extend the coherence depth offers the opportunity for digital refocusing beyond the Nyquist range, albeit at the expense of significant wastage of source power. When refocused, the light scattered/reflected from the elongated illuminated volume 404 can be processed into a volume acquired in a single shot, for registration with subsequent volumes acquired with relative motion between the object 402 and the illuminated area 405. Preferably there is some overlap between adjacent volumes to facilitate the registration.

Figures 5A, 5B, 5C:
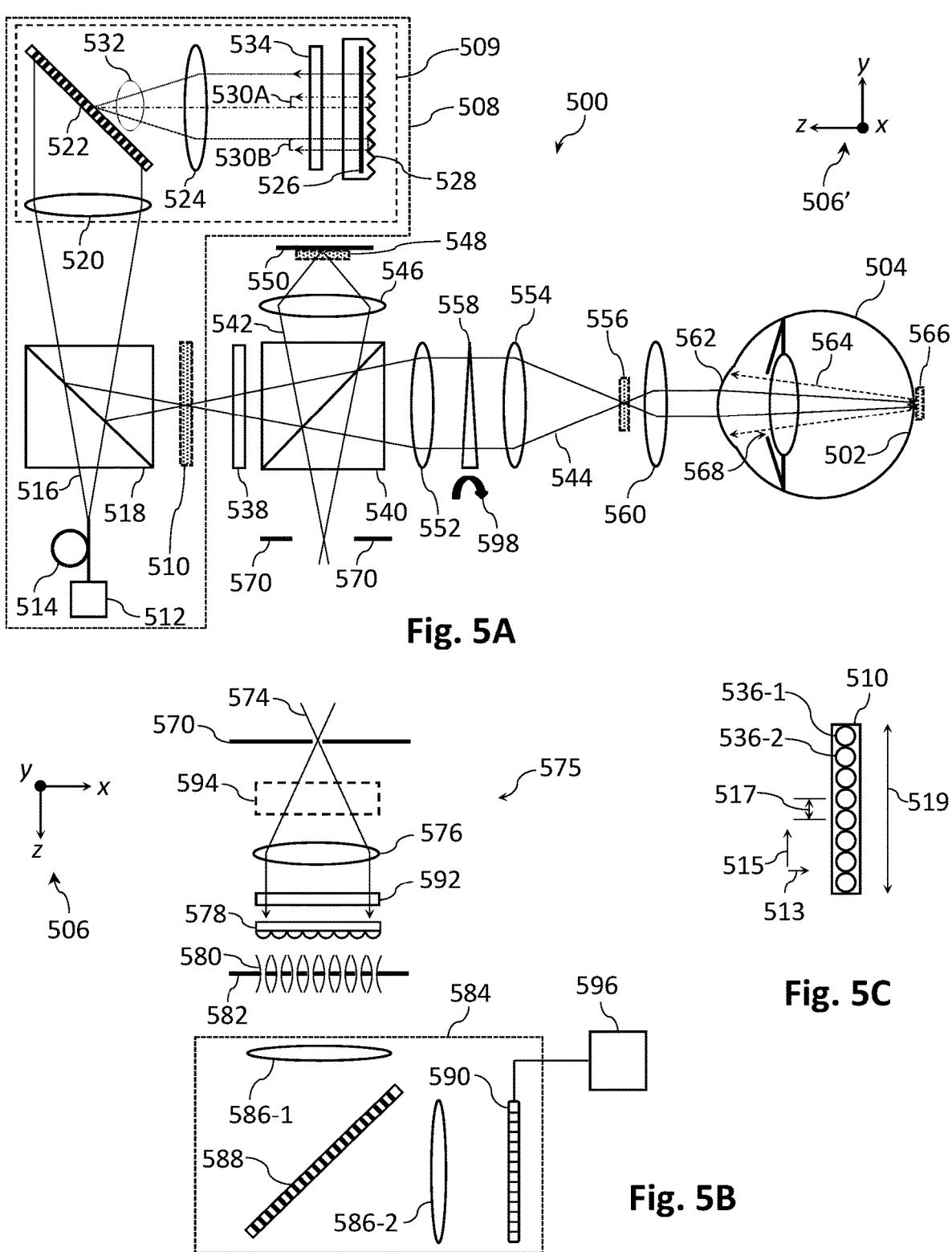
FIGS. 5A and 5B show in schematic plan view an optical imaging apparatus according to an embodiment of the present invention.
FIG. 5C depicts in schematic form the structure of an extended illumination field created in the apparatus of FIGS. 5A and 5B.

FIGS. 5A and 5B show in schematic plan view an optical imaging apparatus 500 for in-vivo tomographic imaging of the retina 502 of a human eye 504, according to an embodiment of the present invention. The source, sample and reference arms of the apparatus 500 are depicted in FIG. 5A, with the detection arm depicted in FIG. 5B. It should be noted that the coordinate axes 506 in FIG. 5B are rotated with respect to the coordinate axes 506' in FIG. 5A.

Referring firstly to FIG. 5A, the apparatus 500 comprises an illumination system 508 that creates, from a spectrally incoherent, i.e. broadband, light source 512 and a wavelength comb generator 509, an extended illumination field 510 comprising a plurality of linearly displaced combs of wavelengths selected from across the bandwidth of the light source. With reference to FIG. 5C, in certain embodiments this extended illumination field 510 is spatially coherent over its short axis 513, corresponding to the x-axis, but has an enhanced spectral coherence through comb filtering as explained below. The extended illumination field 510 preferably has a short spatial coherence length in its long axis 515, corresponding to the y-axis, as the comb filtering is tuned along that axis, so that positions separated by more than a spatial coherence distance 517 are no longer mutually coherent. In other words, the spatial coherence length of the extended illumination field 510 in its long axis 515 is less than the length 519 of the extended illumination field 510 in its long axis 515.

In the illustrated embodiment a SLED or supercontinuum light source 512, which is preferably spatially single moded and spectrally broad, i.e. spatially coherent but spectrally incoherent, is coupled via a singlemode optical fibre 514 to the remainder of the apparatus 500. The singlemode fibre 514 is preferably polarisation-maintaining and oriented such that the emitted light 516 passes through a polarisation beam splitter (PBS) 518 without loss, before passing to a wavelength comb generator 509 comprising spherical lenses 520, 524, a retroreflection array 528 and a wavelength dispersive element in the form of a transmissive diffraction grating 522. The light 516 is collimated by the spherical lens 520, dispersed with the transmissive diffraction grating 522 and refocused with the spherical lens 524 to generate a dispersed focused illumination stripe 526 incident on the retroreflection array 528. In the illustrated embodiment the retroreflection array is in the form of a TIR prism array, but in other embodiments it may be in the form of a saw tooth mirror or a lenslet array in combination with a plane mirror.

As described in more detail in published US patent application No 2020/0103215 A1, the function of the retroreflection array 528 is to provide a position-dependent displacement 530A, 530B on the various wavelength components 532 in the dispersed stripe 526, which can be positive or negative and of varying magnitude depending on the location of the wavelength components on the retroreflection array. A quarter waveplate 534 is preferably included so that on double pass the polarisation state of the reflected light is rotated by 90 degrees, suitable for reflection at the PBS 518 towards the eye 504 under test. Light reflected from the retroreflection array 528 is now collimated by the lens 524 to create an angularly dispersed spectrum of light comprising the dispersion of the grating 522 and a wavelength-dependent angular component associated with the displacements 530A, 530B imposed by the retroreflection array 528. The wavelength dispersion is unwound by the return passage through the diffraction grating 522, leaving only the displacement-related angular components which are a repeating function of wavelength. That is, there are repeating series of wavelengths corresponding to each angular component.

The undispersed light is then re-imaged by the lens 520 and directed by the PBS 518 towards an intermediate image plane where the extended illumination field 510 is formed as a continuum of combs of wavelengths each selected from across the full bandwidth of the light source 512. FIG. 5C depicts an extended illumination field 510 in simplistic fashion as a linearly displaced series of discrete wavelength combs 536-1, 536-2 etc, but in reality the wavelength combs form a continuum. That is, between any two wavelength combs there will be another wavelength comb with wavelengths partially overlapping those of the other combs. The number of teeth in the retroreflection array 528 across which the dispersed illumination stripe 526 extends determines the number of wavelength components in each wavelength comb 536-1, 536-2. A quarter waveplate 538 may be included to adjust the polarisation, before the extended illumination field 510 is split by a beam splitter 540, which may be a PBS, into a reference beam 542 and a sample beam 544. The reference beam 542 is imaged by a spherical lens 546 to form a reference dispersed stripe 548 proximate to a reference mirror 550, which may include a cylindrical element to modify the numerical aperture. A quarter waveplate may also be provided to rotate the polarisation state of the reflected reference beam. The reflected reference beam is reimaged to a linear aperture 570, which may for example have dimensions of 200 μm×12 mm in the x- and y-axes as defined by the Cartesian axes 506 in FIG. 5B.

The sample beam portion 544 of the extended illumination field 510 is directed and imaged by relay lenses 552, 554 to an intermediate image plane 556, with optional steering by a beam deflection element 558 that is shown as transmissive but may be reflective. The extended illumination field at this intermediate image plane 556 is then projected by a combined optical relay comprising a spherical lens 560 and the optical power elements of the eye 504, primarily the cornea 562, to illuminate the retina 502 across a contiguous volume 566 that is elongated in the y-axis. Light 564 reflected or scattered from the illuminated volume 566 that passes through the pupil 568 of the eye 504 is captured and directed back through the cornea 562 and the train of lenses 560, 554 and 552, then directed by the beam splitter 540 to the linear aperture 570.

The detection arm of the apparatus 500, which includes a measurement system 575, is described with reference to FIG. 5B, in which the coordinate axes 506 are rotated to show the narrow opening of the linear aperture 570 in the x-axis, which corresponds to the short axis 513 of the extended illumination field 510. Noting that the y-axis, corresponding to the long axis 515 of the extended illumination field 510, is now oriented into the page, the combined returning reference and sample light 574 is passed through the aperture 570 for rejection of multi-scattered light. The combined light 574 is directed to a lens assembly 576, which may for example comprise a series of cylindrical lenses such as the lens assembly 264 shown in FIGS. 2A and 2B or a combination of spherical and cylindrical lenses. The resultant light field is then sparsely sampled in the far field in the x-axis with a spatial sampling element in the form of a cylindrical lenslet array 578. The linear beamlets 580 produced by the cylindrical lenslet array 578 may be passed through a linear aperture array 582 for further rejection of multi-scattered light, then passed to a spectrometer 584 for capture of phase and amplitude information over a range of wavelengths. As in the previous examples, in the illustrated embodiment the spectrometer 584 comprises lens relay elements 586-1, 586-2, a wavelength dispersive element in the form of a diffraction grating 588 or dispersive prism, and a 2-D sensor array 590. A polariser 592 may be included to analyse the interference of the returning reference and sample light, with an optional polarisation walk-off element 594 providing a walk-off of, say 250 μm, to create an off-axis holographic capture. That is, when the polariser 592 analyses the interference of the reference and sample beams, angular interference fringes are created in the far field axis for sparse sampling at the cylindrical lenslet array 578. The polariser 592 can be omitted if there is no polarisation control in the apparatus, e.g. if the beam splitters 518, 540 are power beam splitters rather than polarisation beam splitters. Importantly, the short axis of the illuminated volume 566 on the retina 502 is sparsely sampled at multiple locations before projection onto the 2-D sensor array 590, providing spatial resolution in the short axis of the illuminated volume 566.

As in the previous examples the phase and amplitude information obtained with the 2-D sensor array 590 is processed with a computer 596 equipped with suitable machine-readable code to generate a contiguous 3-D image or representation of the illuminated contiguous volume 566 of the retina 502. In an important difference in the data analysis, however, each wavelength component captured at each position along the dispersed beam on the 2-D sensor array 590 is further filtered by the comb wavelength structure of the extended illumination field 510. This ensures that the depth over which coherence between the sample and reference beams can be achieved is enhanced by the ratio of the spectrometer pixel resolution divided by the width of each wavelength component of the wavelength comb, which can typically be of the order of 50×. This phase and amplitude information detected over the plurality of wavelength combs enables the OCT image to be digitally refocused over a much larger range of depths, as well as recovery of the tomographic phase and amplitude information at many times the Nyquist depth. This is similar to the effect that would be achieved with a wavelength comb obtained by passing the light 516 from the light source 512 through an etalon, but with the significant difference that all wavelengths across the bandwidth of the source 512 are utilised.

Larger volumes of the retina 502 can be imaged by moving the elongated illuminated volume 566 in one or two lateral dimensions by appropriate rotation 598 of the beam steering element 558, preferably with some overlap for co-registration of acquired data.

In the embodiment shown in FIG. 5B the measurement system 575 is configured such that the light 564 reflected or scattered from the illuminated volume 566 of the retina 502 is sparsely sampled in the far field, e.g. at or near a Fourier plane, in a first dimension and densely sampled in the near field, e.g. at or near an image plane, in a second dimension, by the cylindrical lenslet array 578 and the pixels of the 2-D sensor array 590 respectively. However it will be appreciated that several other sampling combinations are possible with appropriate reconfiguration of the measurement system 575. For example the measurement system 575 could be configured to sample the reflected or scattered light 564 in the far field in both the first and second dimensions, or in the near field in both the first and second dimensions. In other embodiments the measurement system 575 may be configured such that the reflected or scattered light 564 is sparsely sampled in the near field by the cylindrical lenslet array 578 and densely sampled in the far field by the pixels of the 2-D sensor array 590. As discussed previously the processing of the phase and amplitude information can be tailored accordingly.

It will be appreciated that the apparatus 500 could be modified for corneal imaging, or for use with non-ocular samples, by providing additional focusing power, e.g. with an objective lens, to act in lieu of the optical power elements of the eye.

A further embodiment enables both enhancement of the utilisation of available light for in-vivo imaging and the creation of an elongated illumination field that is spatially incoherent in its short axis via temporal, i.e. time-offset, incoherence, while ensuring that each point remains coherent with the reference beam in the far field. Since in-vivo measurements typically have phase wash-out due to motion for exposure times in excess of 100 μs, the utilisation of available optical power may be limited by the camera frame rate, which is typically several hundred frames per second for a high pixel count camera. Consequently, the available power may need to be limited to a duty cycle of less than 10%, e.g. 3% for 100 us exposures and a 300 Hz frame rate, and in some instances it can be beneficial to be able to increase this for more efficient use of light. Additionally, a more spatially incoherent illumination field would reduce the likelihood of multi-scattered light creating noise artefacts.

Figure 6:
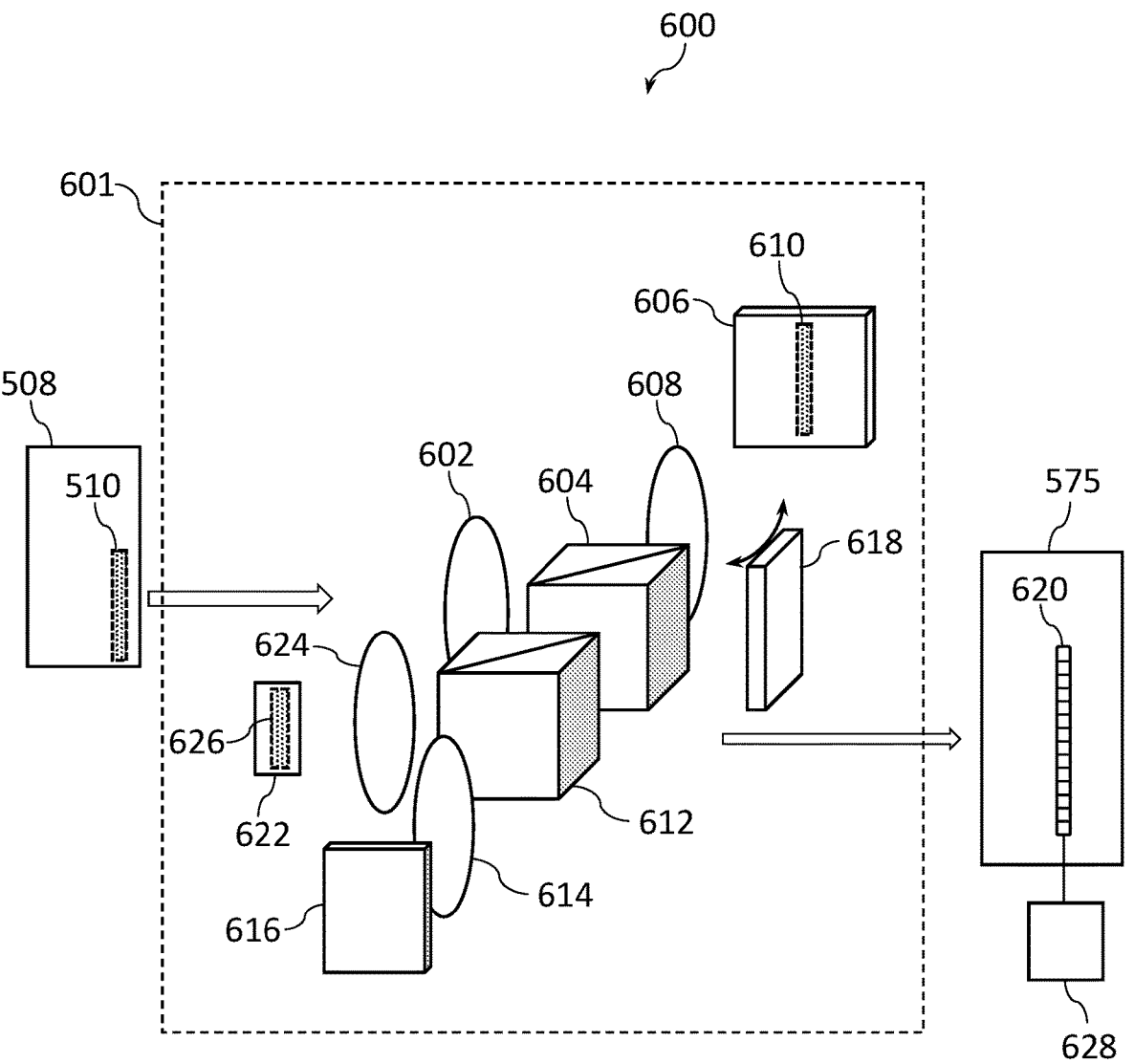
FIG. 6 shows in schematic oblique view an optical imaging apparatus according to an embodiment of the present invention.

Accordingly, FIG. 6 shows a schematic oblique view of an optical imaging apparatus 600 according to an embodiment of the present invention, shown for simplicity without apertures or relay lenses that can be optionally provided. This optical imaging apparatus 600 comprises an illumination system 508 as described with reference to FIG. 5A and an interferometer 601 having a measurement system 575 as described with reference to FIG. 5B, for imaging a volume of an object 622 that may for example be the retina of a human eye.

An extended illumination field 510 produced by the illumination system 508 is received by a spherical lens 602 and directed to a beam splitter 604, which may be a polarisation beam splitter (PBS), which separates out sample and reference light portions. The reference light portion is directed towards and refocused onto a reference mirror 606 by a spherical lens 608 to create an image 610 of the extended illumination field 510. The reference mirror 606 may also provide for rotation of polarisation state to direct light through the beam splitter 604 and a second beam splitter 612, for refocusing by a spherical lens 614 onto a secondary reference mirror 616. The sample light portion from the beam splitter 604 is directed towards a scanning mirror 618 which, during a single frame of a 2-D sensor array 620 in the measurement system 575, sweeps the angle of the sample light and optionally rotates polarisation such that the beam splitters 604 and 612 direct the sample light towards an object 622 to create a temporally modulated angular component in the short axis of the extended illumination field 510, which is focused onto the object 622 by a spherical lens 624. This illuminates a contiguous volume 626 of the object 622 with an illumination field that is a spectrally dispersed wavelength comb in its long axis and a temporally swept beam in its short axis within a single frame of the 2-D sensor array 620. Light reflected or scattered from the illuminated volume 626 of the sample 622 is combined with the reference beam, optionally focused through an aperture (not shown) then projected into the measurement system 575 for spatial sampling and detection as described previously. Phase and amplitude information obtained with the 2-D sensor array 620 is processed with a computer 628 equipped with suitable machine-readable code to generate a contiguous 3-D image or representation of the illuminated contiguous volume 626 of the object 622. Advantages of the temporal sweeping of the illumination include more efficient use of source light and a reduced likelihood of noise artefacts from multiple scattering because of the spatial incoherence created in the long axis of the illuminated volume 626. There is also the potential to multiplex two or more single mode light sources together without splitter losses for higher powers.

Figure 7A:
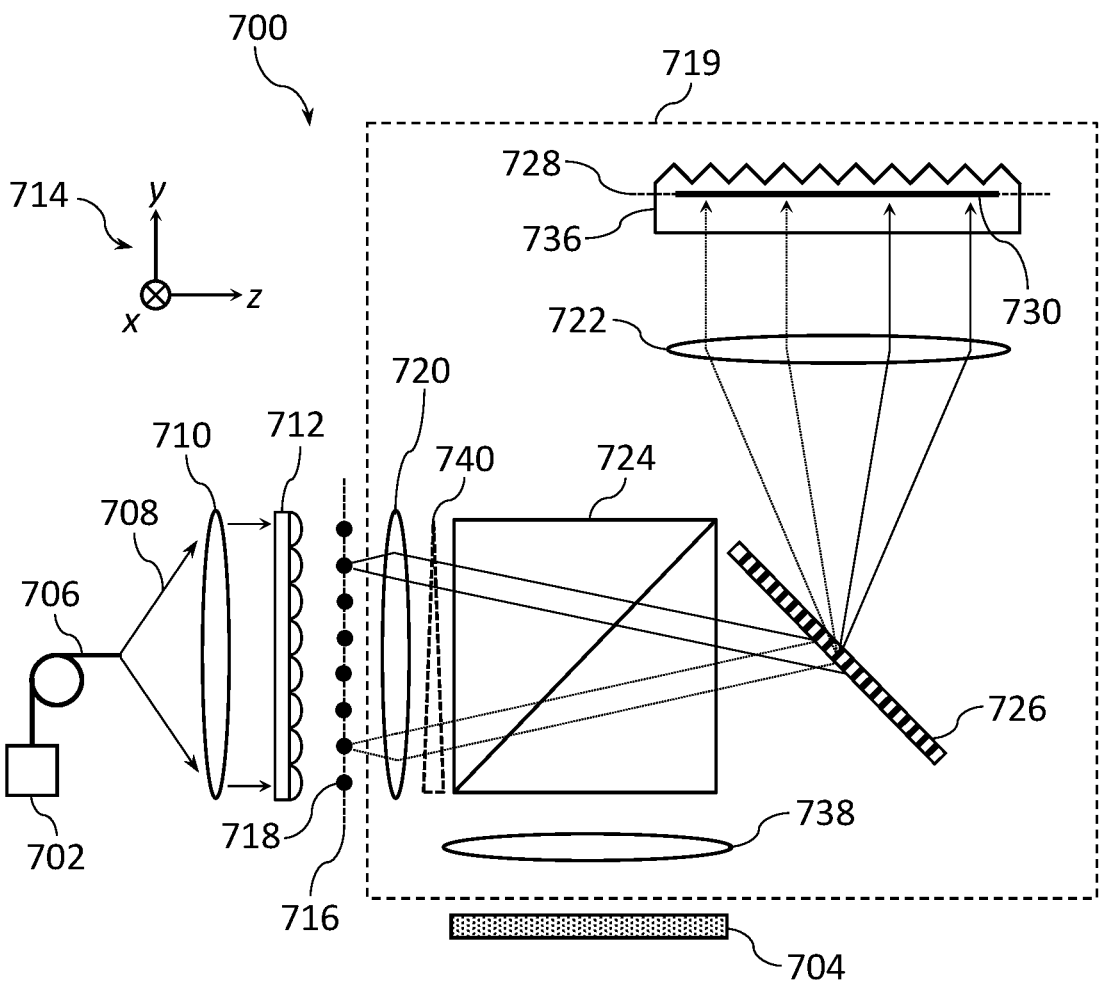
FIG. 7A shows in schematic plan view an illumination system for generating a spectrally structured extended illumination field (SSEIF) according to an embodiment of the present invention.

FIG. 7A shows in schematic plan view an illumination system 700 for generating, from a lightguide fibre-coupled light source 702 that is spatially incoherent as well as spectrally incoherent, a spectrally structured extended illumination field (SSEIF) 704 suitable for tomographic imaging. Since spatially incoherent light sources are generally less expensive than partially or fully spatially coherent sources, this approach offers the possibility of creating a lower cost source for a given output power. The illustrated embodiment utilises a spatially incoherent light source 702 with a bandwidth of 200 nm centred at 850 nm, coupled to a lightguide 706 having a 200 μm core diameter and an NA of 0.22. Spatially incoherent light 708 emanating from the lightguide 706 illuminates an optical power element 710 followed by a spatial sampling element in the form of a cylindrical lenslet array 712 having forty cylindrical lenslets on a 400 μm pitch, each having a focal length of 1 mm. The optical power element 710 comprises a combination of cylindrical lenses selected to provide focal lengths of 20 mm and 40 mm in the x-axis and y-axis as defined by the Cartesian axes 714, such that the light 708 is collimated in the y-axis and focused in the x-axis to produce, in the absence of the cylindrical lenslet array 712, an elongated illuminated area of 200 μm×17.6 mm (x-axis×y-axis) at the plane 716. Inclusion of the cylindrical lenslet array 712 causes the light 708 to be imaged to a series of forty lines 718 on a 400 μm pitch at the plane 716, each line having dimensions of 5 μm (y-axis)×200 μm (x-axis) and an angular content corresponding to an NA of 0.2 (y-axis)×0.22 (x-axis). Because of the small y-axis dimension, each line 718 is effectively a source with some degree of spatial coherence, suitable for coherence tomography.

Figure 7B:
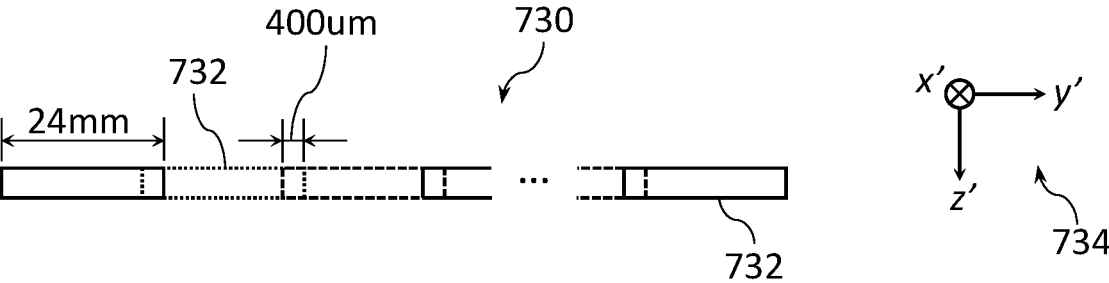
FIG. 7B depicts in schematic form an illumination field produced at an intermediate stage in the illumination system of FIG. 7A.

The intermediate image plane 716 passes to a wavelength comb generator 719 where it is relayed by spherical lenses 720, 722 each having a focal length of about 87 mm, via a beam splitter 724, which may be a polarisation beam splitter, and a dispersion grating 726 which in this embodiment is a transmission grating with 1200 lines/mm. This creates, at an image plane 728, a structured illumination field 730. As shown schematically in FIG. 7B, in this example embodiment the structured illumination field 730 comprises forty strips 732 of dispersed illumination, with each strip about 24 mm long and offset by about 400 μm in the y'-axis as defined by the Cartesian axes 734.

A sawtooth retroreflection array 736 positioned at or near the image plane 728 applies a wavelength-dependent displacement that can be positive or negative as explained previously with reference to FIG. 5A. In the basic embodiment depicted in FIG. 7A the teeth of the retroreflection array 736 are on a 400 μm pitch, corresponding to that of the cylindrical lenslet array 712, although it may be preferable to have slightly larger teeth to account for losses towards the edges of the teeth. Several other forms of retroreflection array could be used. In one example the separation of the teeth may be chirped to provide a linearised frequency response. In another example the teeth could be arranged in a non-periodic fashion to provide wavelength combs with non-periodic wavelengths or discontinuities to randomise the wavelengths, which can be beneficial for minimising orders in a subsampled OCT apparatus.

Each wavelength component reflected by the retroreflection array 736 is collimated by the lens 722. Angular components of the reflected beams that were induced by the grating 726 are unwound by the second passage through the grating, leaving the angular components associated with the wavelength-dependent displacements imposed by the retroreflection array 736. The light field is now directed by the beam splitter 724 towards an imaging lens 738 that focuses each line, but with displacements resulting from the retroreflection array 736, to produce the spectrally structured extended illumination field (SSEIF) 704. With each of the forty 24 mm long strips 732 in the structured illumination field 730 extending across sixty teeth in the retroreflection array 736, the SSEIF 704 will contain a comb of sixty wavelengths at each position for each of the forty strips 732. The SSEIF 704 can be thought of as a partially overlapping set of extended illumination fields 510 described above with reference to FIGS. 5A to 5C, although its x-axis dimension (into the page) will depend on the length of the lines 718 formed at the image plane 716.

The SSEIF 704 produced by the illumination system 700 in the described example embodiment will have a discontinuity in its wavelength combs every 400 μm along its length. In other embodiments a dispersive wedge 740 is introduced between the lens 720 and the beam splitter 724, to slightly displace the discontinuities so they don't occur in the same locations between the wavelength combs.

In an alternative embodiment the illumination system 700 is configured to produce a single line 718 at the image plane 716. For example the cylindrical lenslet array 712 may be omitted and the optical power element 710 modified to convert the spatially incoherent light 718 emanating from the lightguide 706 to a single line 718 that, as before, may have dimensions of 5 μm (y-axis)×200 μm (x-axis). In this embodiment it may be advantageous for the core dimensions of the lightguide 706 to approximate the desired dimensions of the line 718.

Figure 7C:
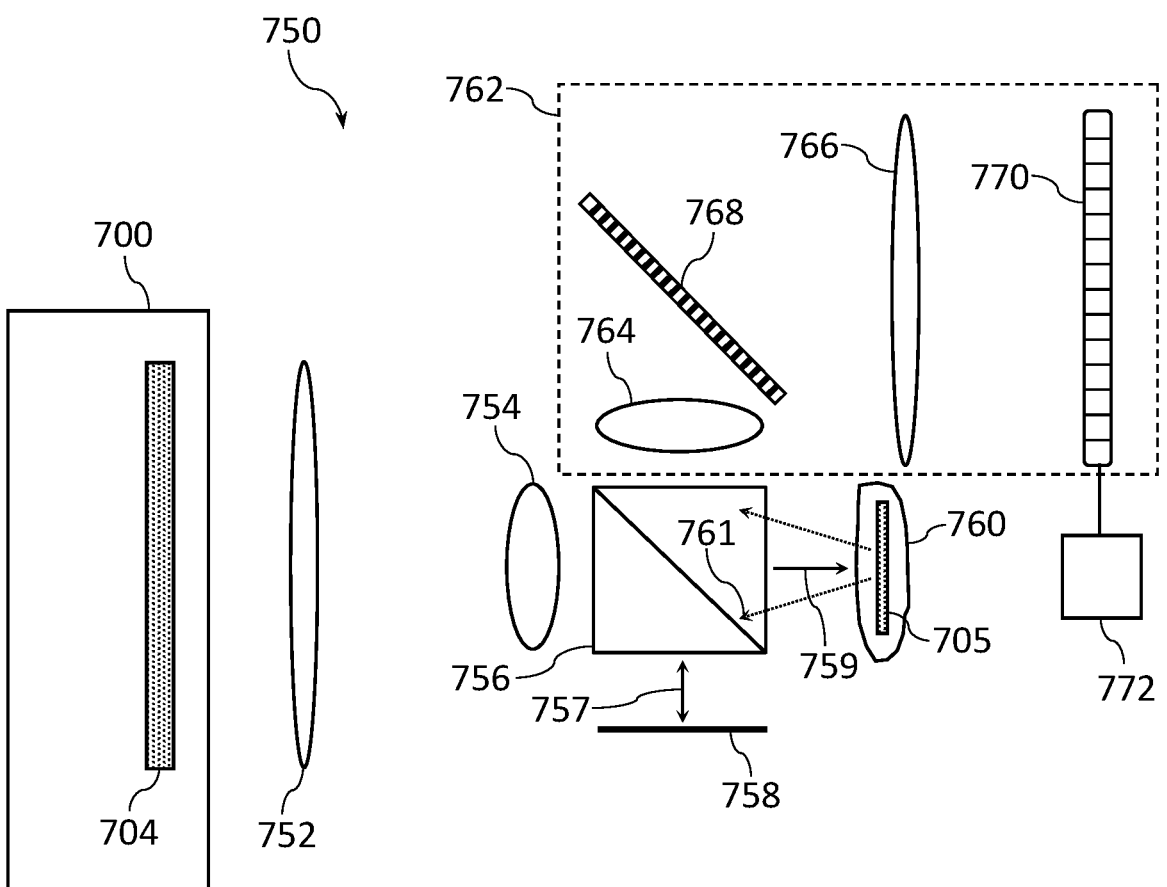
FIG. 7C shows in schematic plan view a tomographic imaging apparatus that utilises the SSEIF generated by the illumination system of FIG. 7A, according to an embodiment of the present invention.

FIG. 7C depicts in schematic plan view a tomographic imaging apparatus 750 that employs an SSEIF 704 generated by the illumination system 700 depicted in FIG. 7A. A system of relay lenses 752, 754 reimages the SSEIF 704 via a beam splitter 756 as reference and sample beams 757, 759 to a reference mirror 758 and an object 760, to illuminate a contiguous volume 705 of the object. In certain embodiments the beam splitter 756 is a polarisation beam splitter, while in other embodiments it may be a power splitter or an aperture splitting element. A light field reflected from the reference mirror 758 and a light field 761 scattered or reflected from the illuminated volume 705 of the object 760 are recombined at the beam splitter 756 to create a two-dimensional interference pattern, then passed to a measurement system in the form of a spectrometer 762 for capture of phase and amplitude information over a range of wavelengths. As in the previous examples, in the illustrated embodiment the spectrometer 762 comprises relay lenses 764, 766, a transmissive diffraction grating 768 and a 2-D sensor array 770. For the case where the beam splitter 756 is a polarisation beam splitter, quarter wave plates may be included to redirect the reflected or scattered light fields towards the relay lens 764, with appropriate polarisation analysing elements such as walk-off plates or polarisers to create the two-dimensional interference pattern. The relay lenses 764, 766 and grating 768 in combination separate out each of the different wavelength components from the SSEIF 704, as modulated by the interaction with the object 760, onto the sensor array 770, for analysis of phase and amplitude information in a computer 772 equipped with suitable machine-readable program code.

Figure 7D:
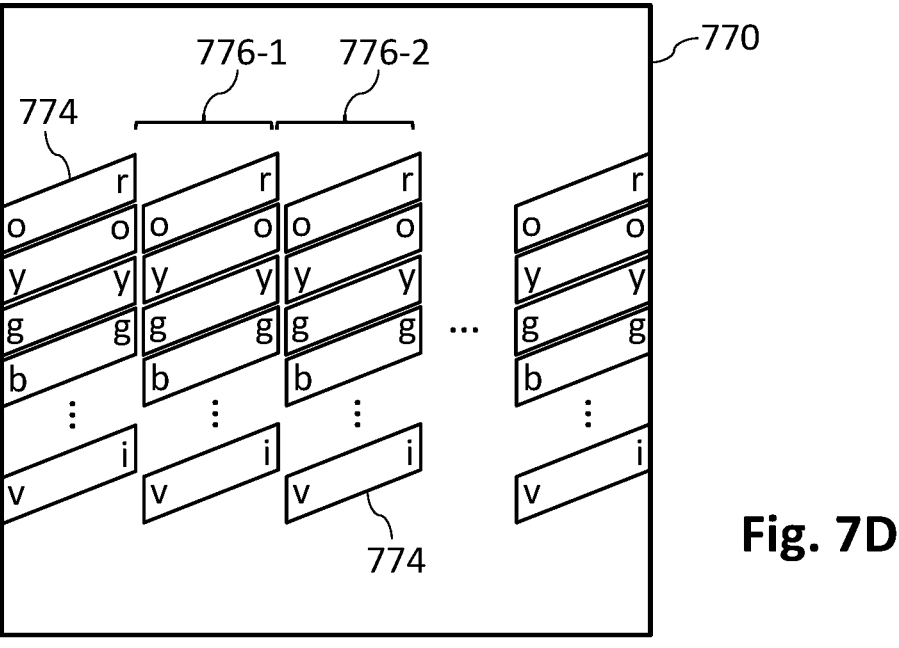
FIG. 7D depicts in schematic form the structure of dispersed interferograms on a 2-D sensor array in the apparatus of FIG. 7C.

Because each of the wavelength components in a comb at each location along the SSEIF 704 comprises a narrow wavelength band, the multi-wavelength two-dimensional interference pattern produced from interference of the reflected or scattered light fields 757, 761 is not significantly blurred by the dispersion at the grating 768, but instead creates a wavelength-separated series of interferograms for projection by the lens 766 onto the 2-D sensor array 770 in the near field. That is, the multi-wavelength interference pattern is separated multiple times onto discrete locations of the 2-D sensor array 770 according to the number of wavelength components in each wavelength comb 536-1, 536-2, which as mentioned previously is determined by the number of teeth illuminated at the retroreflection array 728. As depicted schematically in FIG. 7D, the result of the dispersion from the grating 768 is a plurality of sets 776-1, 776-2 of wavelength-separated near field interferograms 774 on discrete locations of the 2-D sensor array 770. In our example embodiment where the SSEIF 704 contains a comb of sixty wavelengths at each position for each of forty strips 732 in the structured illumination field 730, there will be forty sets 776-1, 776-2 of interferograms spaced horizontally across the sensor array 770, with each set 776-1, 776-2 having sixty wavelength-separated interferograms 774 in the vertical direction. The end wavelengths of one set 776-1 of interferograms matches the starting wavelengths of the next set 776-2, as indicated by the letters r, o, y, g, b, i and v representative of different wavelengths, creating the observed tilted tiled shape. Noting that each set 776-1, 776-2 of interferograms results from an individual line 718 at the intermediate image plane 716, the outcome from an embodiment with only one line 718 would be a single set of wavelength-separated interferograms 774 on the sensor array 770, although in this case the interferograms could be projected across a much wider portion of the sensor array.

For clarity the tomographic imaging apparatus 750 has been depicted in a basic fashion in FIG. 7C. In addition to the components shown, a 4F relay system may be included between the beam splitter 756 and the object 760, and optionally also the between the beam splitter and the reference mirror 758, to allow the object 760 be re-imaged through an aperture with a rectangular shape corresponding to the SSEIF 704. The aperturing serves to reject multiple-scattered light and defocused light scattered from layers of the object 760 away from the focal plane, allowing the wavelengths to be stacked on the 2-D sensor array 770 as closely as possible without the need for large buffer regions. The 4F relay system may also include a beam steering element for directing the re-imaged SSEIF across the object 760. In certain embodiments the beam steering element is a reflective 1-D angular deflection element driven by a galvanometer or similar for scanning the illumination in a direction parallel to the short axis of the re-imaged SSEIF to provide an imaging volume of desired dimensions. In one example we consider an apparatus 750 equipped with a 4K sensor array 770 with, say, 12 Mpixels and operating at 300 Hz, configured to provide an illuminated volume 705 of lateral dimensions 12 mm×0.2 mm and a lateral resolution of 4 μm. Scanning the re-imaged SSEIF across a 12 mm×6 mm area of the object 760 with an update rate of 10 Hz would provide the equivalent of 45 million A-scans per second, more than two orders of magnitude greater than current state of the art commercially available scanning OCT systems, providing capabilities for high-speed angio-OCT or high-resolution surgical OCT imaging.

The processing of the phase and amplitude data captured by the 2-D sensor array 770 can proceed in a similar fashion to normal OCT processing, although a few points should be noted. Firstly, the high capture NA associated with the 4 μm lateral resolution enables more efficient capture of light reflected or scattered from the object 760, with the amount of signal captured being proportional to the square of the NA. Secondly, although the reduced number of wavelengths in the comb illumination will reduce the Nyquist range of the OCT system 750, because the relative phase of all relative A-scans captured in a frame of the sensor array 770 is fixed, the captured signal can be transformed into the spatial Fourier domain via a Fourier transform. The selection of a specific layer in an object 760 is now able to be gated not only by the coherence gate provided by the OCT, which may have a repeating function if a linear frequency optical comb is employed, but by the ability to apply focusing transformations to the Fourier transformed signal in the same way that focusing a microscope selects a narrow depth of field for a given NA lens. The focusing effect can be combined with the coherence gate to select out the correct order of the coherence, as only one order will correspond to the specific focusing term. Thirdly, aberration correction can be applied numerically, as is understood when a 3-D phase-registered data set is captured. In some cases it may be advantageous to provide unambiguous phase retrieval, i.e. quadrature detection, to assist in removing order artefacts from the captured signal. In the next example embodiment we describe how the snapshot OCT imaging system 750 shown in FIG. 7C can be adapted for polarisation state or full quadrature detection, by trading field of view for sampling at multiple phases or polarisation states.

Figure 8:
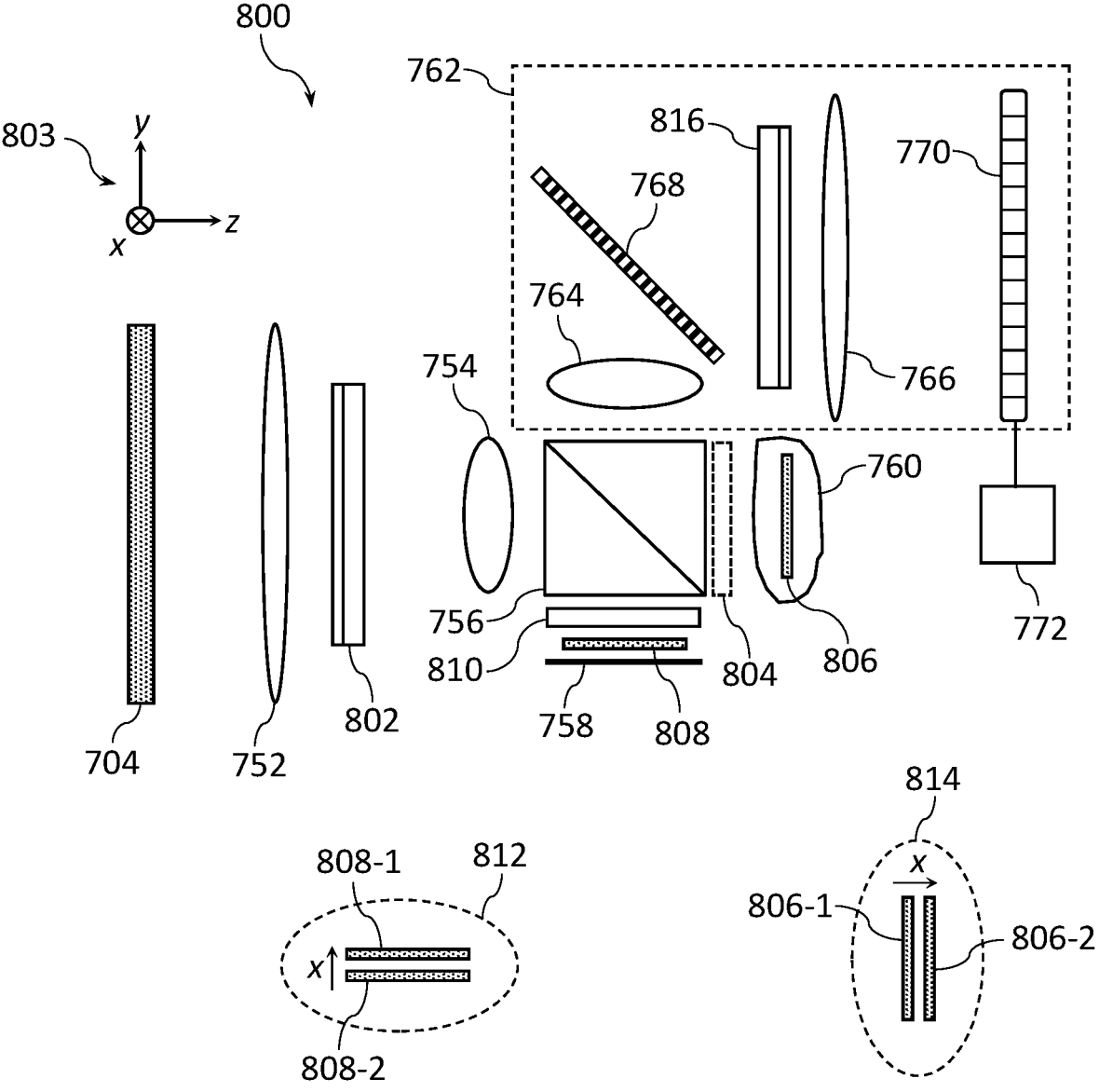
FIG. 8 shows in schematic plan view the tomographic imaging apparatus of FIG. 7C modified for polarisation analysis of an object, according to an embodiment of the present invention.

FIG. 8 shows in schematic plan view an OCT apparatus 800 similar to that shown in FIG. 7C but modified for polarisation analysis, with identical numbering for common components. In this example the field of view in the short axis of a re-imaged SSEIF 806 on an object 760 is reduced to 48 μm, with other parameters equivalent to the apparatus 750 of FIG. 7C. An incoming SSEIF 704 is split into two angular components, corresponding to two polarisation states, by a birefringent wedge 802 providing a horizontal/ vertical polarisation angular split of 0.05/f radians in the short axis of the SSEIF, i.e. the x-axis as defined by the Cartesian axes 803, where f is the focal length of the lens 752. The split polarisation states are imaged by the lens 754 and split by the beam splitter 756 to produce at the reference mirror 758, as shown in the inset view 812, a pair of non-overlapping SSEIF strips 808-1, 808-2 separated in the x-axis, i.e. into the page. In the absence of a walk-off element 804, a corresponding pair of SSEIF strips 806-1, 806-2 would also be produced at the object 760 as depicted in the inset view 814. An optional polarisation walk-off element 804, for example a 0.5 mm thick YVO$_4$ plate, would provide approximately 50 μm of walk off to coalesce the two polarisation states, that are mutually incoherent, for analysis of orthogonal polarisation states at the same location on the object 760. If the walk-off element 804 were present, light reflected or scattered from the now overlapping SSEIF strips 806-1, 806-2 on the object 760 would again be split into two polarisation states by the second passage through that element 804. In scanning implementations, orthogonal polarisation states can be analysed by sampling the same area of the object 760 sequentially, providing the benefit of not polarising the captured reflected or scattered light. Consequently, we will consider the case where the walk-off element 804 is omitted and the object 760 is instead illuminated independently with two orthogonally polarised SSEIF beams 806-1, 806-2 as shown in the inset view 814, via a scanning mechanism (not shown).

The apparatus 800 also comprises a quarter wave plate 810 oriented at an angle of 22.5 degrees to a polarisation axis that provides a 45 degree polarisation rotation of the reflected reference light. The SSEIF polarisations reflected by the reference mirror 758 and the object 760 are combined by the beam splitter 756 and directed towards a measurement system in the form of a spectrometer 762. A birefringent wedge 816 in the spectrometer 762 provides a polarisation-dependent angular deviation of $0.1/f_1$ radians in the short axis (i.e. the x-axis) between the orthogonal polarisation states, designed such that the polarisation states are offset by 0.1 mm at the 2-D sensor array 770. Here, $f_1$ is the focal length of the lens 766 that focuses onto the sensor array 770. In this configuration each of the four generated displacements captures a component of both the reference 758 and object 760 reflected or scattered light, and interferes them providing phase and amplitude information for each of the two orthogonal polarisation states in the incident SSEIF 704, for extraction and processing in a computer 772.

Although this polarisation information is valuable in itself for allowing various contrast enhancements of the object 760 via measurement of birefringence and depolarisation properties, it is also possible to provide coherent input polarisation states which can then be analysed by polarisation to create a measure of the full quadrature phase.

In the tomographic imaging apparatus depicted in FIGS. 5A to 8, phase and amplitude detection of captured signals can be constructed for each wavelength component inde-
pendently, which is valuable if spectral information of an object is to be retrieved independently of the structural OCT information. For example if illumination across the full visible spectrum is provided, potentially extending into the NIR, a series of, say, sixty wavelengths determined by the wavelength comb generator 509, 719 may provide information on the chemical composition of an object. In the case of retinal imaging the spectral information may indicate a diseased state of the retina.

One feature of this form of interferometry, particularly for the near field interferometry apparatus shown in FIGS. 7A to 8, is that control of the relative angle of the reference beam and the sample beam allows tuning of the depth range at which the beams can interfere. In some applications this may be limiting, but it can also be valuable in providing an additional gating mechanism to ensure that only the region of interest of an object of is being imaged.

For a microscopic OCT apparatus, or if a simplified incoherent imaging system is required, it can be advantageous to use a high dispersion objective lens to provide a wavelength-dependent depth of field. For example for a 10 mm focal length microscope lens with an NA=0.5 constructed from SF10 glass, the dispersion of the glass will lead to a variation of focal depth of 100 μm over a wavelength range of 800 to 1000 nm. Since this depth can be comparable to the Nyquist range, individual captured holograms can be refocused digitally to provide a coherence gating.

The optical imaging apparatus 500, 600, 750 and 800 depicted in FIGS. 5A to 8 can each be used for angio-OCT applications. For example phase and amplitude information can be captured in two or more sequential frames of the 2-D sensor array 590, 620, 770 at a given location on a retina 502 or other biological object 622, 760, for processing in the computer 596, 628, 772 for measurement of changes due to blood flow in an illuminated volume. Additionally or alternatively, in the apparatus 500 of FIGS. 5A and 5B the light source 512 can be temporally modulated, preferably at a rate of 100 Hz to several kHz, to provide a stream of pulses, with each pulse being for example of order 100 us in duration. On the other hand, with the apparatus 600 depicted in FIG. 6 modulation of the illumination can be applied spatially via the scanning mirror 618, i.e. with no need to modulate the light source intensity, thereby enhancing the utilisation of light available from the light source.

Applications of an illumination system 508, optionally with the scanning variation discussed regarding FIG. 6, to hyperspectral analysis of light reflected or scattered from an object can be envisaged using broad spectrum supercontinuum sources. This would allow coherent detection of the reflected or scattered light, providing enhanced sensitivity, by introducing a reference beam. It would also provide a more robust imaging, i.e. less sensitive to precise focusing, due to the extended coherence length of the extended illumination fields 510 or 626.

The various apparatus described above have been depicted in reflective configurations, e.g. for in-vivo retinal imaging. However it will be appreciated that in general the inventive principles could also be applied to transmissive configurations where light scattered from a partially transmissive sample is captured.

In each of the illustrated embodiments, focusing of light beams is performed with optical power elements in the form of lenses. However it will be appreciated that other forms of optical power elements such as off-axis parabolic or ellipsoidal mirrors could be used.

Although the invention has been described with reference to specific examples, it will be appreciated by those skilled in the art that the invention may be embodied in many other forms.

The invention claimed is:

1. An optical imaging apparatus comprising:
an illumination system comprising a multi-wavelength light source and a wavelength comb generator for illuminating a contiguous volume of an object with an extended illumination field comprising a plurality of linearly displaced combs of wavelengths selected from across a bandwidth of the light source, the volume to be imaged in three spatial dimensions;
one or more beam splitters for splitting light in the extended illumination field into a reference beam and a sample beam, and for combining the reference beam with light from the sample beam reflected or scattered from the illuminated volume of the object; and
a measurement system comprising a spatial sampling element and a two-dimensional sensor array for simultaneous capture of phase and amplitude information, over a range of wavelengths in the linearly displaced plurality of combs of wavelengths, of the reflected or scattered light,
wherein:
the spatial sampling element comprises a cylindrical lenslet array that is configured for far field sampling of the reflected or scattered light in a first dimension, and
the two-dimensional sensor array comprises pixels that are configured for near field sampling of the reflected or scattered light in a second dimension.

2. The apparatus according to claim 1, wherein the spatial sampling element and the two-dimensional sensor array are configured for sparse sampling of the reflected or scattered light in the first dimension and for dense sampling of the reflected or scattered light in a second dimension.

3. The apparatus according to claim 1, wherein the spatial sampling element and the two-dimensional sensor array are configured for far field sparse sampling of the reflected or scattered light in the first dimension at or near a Fourier plane and for near field dense sampling of the reflected or scattered light in a second dimension at or near an image plane.

4. The apparatus according to claim 1, wherein the first dimension corresponds to a short axis of the extended illumination field.

5. The apparatus according to claim 4, wherein the illumination system is configured such that the extended illumination field is substantially spatially coherent across the short axis of the extended illumination field.

6. The apparatus according to claim 4, wherein;
the second dimension corresponds to a long axis of the extended illumination field; and
a spatial coherence distance of the long axis is less than a length of the long axis.

7. The apparatus according to claim 1, further comprising a scanning element for imposing a temporally modulated angular component on the extended illumination field.

8. The apparatus according to claim 1, further comprising a computer for processing the phase and amplitude information to construct a three-dimensional representation of the illuminated volume of the object.

9. An article of manufacture comprising a computer usable medium having a computer readable program code configured to operate the apparatus of claim 8.

10. An optical imaging method comprising the steps of:
illuminating a contiguous volume of an object with an extended illumination field comprising a plurality of linearly displaced combs of wavelengths selected from across a bandwidth of a multi-wavelength light source;
splitting light in the extended illumination field into a reference beam and a sample beam, and combining the reference beam with light from the sample beam reflected or scattered from the illuminated volume of the object; and
simultaneously capturing, with a measurement system comprising a spatial sampling element and a two-dimensional sensor array, phase and amplitude information over a range of wavelengths in the linearly displaced plurality of combs of wavelengths, of the reflected or scattered light,
wherein:
the spatial sampling element comprises a cylindrical lenslet array,
the reflected or scattered light is sampled in the far field in a first dimension by the cylindrical lenslet array,
the two-dimensional sensor array comprises pixels, and
the reflected or scattered light is sampled in the near field in a second dimension by the pixels.

11. The method according to claim 10, further comprising the step of processing the phase and amplitude information to construct a three-dimensional representation of the illuminated volume of the object.

12. An article of manufacture comprising a computer usable medium having a computer readable program code configured to implement the method of claim 11.

13. An optical imaging apparatus comprising:
an illumination system comprising a multi-wavelength light source and a wavelength comb generator for illuminating a contiguous volume of an object with an extended illumination field comprising a plurality of linearly displaced combs of wavelengths selected from across a bandwidth of the light source, the volume to be imaged in three spatial dimensions;
one or more beam splitters for splitting light in the extended illumination field into a reference beam and a sample beam, and for combining the reference beam with light from the sample beam reflected or scattered from the illuminated volume of the object; and
a measurement system comprising a spatial sampling element and a two-dimensional sensor array for simultaneous capture of phase and amplitude information, over a range of wavelengths in the linearly displaced plurality of combs of wavelengths, of the reflected or scattered light,
wherein:
the extended illumination field has a short axis and a long axis,
the extended illumination field is spatially coherent over the short axis, and
a spatial coherence distance of the long axis is less than a length of the long axis.

14. The apparatus according to claim 13, wherein the measurement system is configured such that the short axis of the illuminated volume is sparsely sampled in the far field.

15. The apparatus according to claim 13, wherein:
the measurement system is configured such that the short axis of the illuminated volume of the object is sparsely sampled and projected across the sensor array, providing spatial resolution in the short axis of the illuminated volume.

16. The apparatus according to claim 13, further comprising a scanning element for imposing a temporally modulated angular component on the extended illumination field.

17. The apparatus according to claim 13, further comprising a computer for processing the phase and amplitude information to construct a three-dimensional representation of the illuminated volume of the object.

18. An article of manufacture comprising a computer usable medium having a computer readable program code configured to operate the apparatus of claim 17.

19. An optical imaging method comprising the steps of:
illuminating a contiguous volume of an object with an extended illumination field comprising a plurality of linearly displaced combs of wavelengths selected from across a bandwidth of a multi-wavelength light source;
splitting light in the extended illumination field into a reference beam and a sample beam, and combining the reference beam with light from the sample beam reflected or scattered from the illuminated volume of the object; and
simultaneously capturing, with a measurement system comprising a spatial sampling element and a two-dimensional sensor array, phase and amplitude information over a range of wavelengths in the linearly displaced plurality of combs of wavelengths, of the reflected or scattered light,
wherein:
the extended illumination field has a short axis and a long axis,
the extended illumination field is spatially coherent over the short axis, and
a spatial coherence distance of the long axis is less than a length of the long axis.

20. The method according to claim 19, further comprising the step of processing the phase and amplitude information to construct a three-dimensional representation of the illuminated volume of the object.

21. An article of manufacture comprising a computer usable medium having a computer readable program code configured to implement the method of claim 20.

22. The method according to claim 19, wherein the short axis of the illuminated volume of the object is sparsely sampled and projected across the sensor array, providing spatial resolution in the short axis of the illuminated volume.

* * * * *